United States Patent
Lee

(10) Patent No.: US 12,118,238 B2
(45) Date of Patent: Oct. 15, 2024

(54) PROGRAMMABLE CONTROLLER, PROGRAMMABLE CONTROLLER SYSTEM, DATA STORAGE METHOD, AND RECORDING MEDIUM

(71) Applicant: Mitsubishi Electric Corporation, Tokyo (JP)

(72) Inventor: Weihau Lee, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/266,287

(22) PCT Filed: May 13, 2021

(86) PCT No.: PCT/JP2021/018148
§ 371 (c)(1),
(2) Date: Jun. 9, 2023

(87) PCT Pub. No.: WO2022/239171
PCT Pub. Date: Nov. 17, 2022

(65) Prior Publication Data
US 2024/0045614 A1 Feb. 8, 2024

(51) Int. Cl.
*G06F 3/06* (2006.01)
(52) U.S. Cl.
CPC .......... *G06F 3/0656* (2013.01); *G06F 3/0604* (2013.01); *G06F 3/0652* (2013.01); *G06F 3/0679* (2013.01)
(58) Field of Classification Search
CPC .... G06F 3/0656; G06F 3/0604; G06F 3/0652; G06F 3/0679; G06F 3/0619; G06F 3/0673; G06F 3/06; G05B 19/058
See application file for complete search history.

(56) References Cited

U.S. PATENT DOCUMENTS

2017/0068229 A1 3/2017 Yaoita et al.
2020/0026435 A1 1/2020 Satou et al.
(Continued)

FOREIGN PATENT DOCUMENTS

JP 2013-186623 A 9/2013
JP 2015-176370 A 10/2015
(Continued)

OTHER PUBLICATIONS

International Search Report and Written Opinion mailed on Aug. 10, 2021, received for PCT Application PCT/JP2021/018148, filed on May 13, 2021, 8 pages including English Translation.
(Continued)

*Primary Examiner* — Khoa D Doan
(74) *Attorney, Agent, or Firm* — XSENSUS LLP

(57) ABSTRACT

A PLC includes a data collector to repetitively collect data variable depending on control of a machine from a device memory, a recorder to record data collected by the data collector at a timing corresponding to satisfaction of a predetermined first trigger condition into a storage when the first trigger condition is satisfied, an information adder to add additional information to at least one of first data, recorded by the recorder into the storage, or second data, collected by the data collector after the first data and recorded by the recorder into the storage, when a second trigger condition different from the first trigger condition is satisfied, and an eraser to erase the second data from the storage while retaining the first data in the storage on the basis of the additional information after recording of the first and second data into the storage.

11 Claims, 18 Drawing Sheets

(56) References Cited

U.S. PATENT DOCUMENTS

2020/0310733 A1* 10/2020 Fujimura ................ G06F 3/147
2022/0317650 A1* 10/2022 Fukatsu ............... G05B 19/058

FOREIGN PATENT DOCUMENTS

| JP | 2020-016938 A | 1/2020 |
| JP | 2020-134984 A | 8/2020 |

OTHER PUBLICATIONS

Notice of Reasons for Refusal mailed on Nov. 8, 2022, received for JP Application 2021-575080, 6 pages including English Translation.
Notice of Reasons for Refusal mailed on Feb. 7, 2023, received for JP Application 2021-575080, 6 pages including English Translation.

* cited by examiner

ERASING OF FILE AT ERASER

| ADDITIONAL INFORMATION | TRIGGER ID | RECORDED FILE |
|---|---|---|
| ⋮ | ⋮ | ⋮ |
| AD[T30] | TR[T30] | D[T26-35] |
| AD[T50] | TR[T50] | D[T46-55] |
| — | TR[T70] | D[T66-T75] |
| — | TR[T90] | D[T86-T95] |

| ADDITIONAL INFORMATION | TRIGGER ID | RECORDED FILE |
|---|---|---|
| ⋮ | ⋮ | ⋮ |
| AD[T30] | TR[T30] | D[T26-35] |
| AD[T50] | TR[T50] | D[T46-55] |
| — | — | — |
| — | — | — |

} FREE SPACES

PROGRAMMABLE CONTROLLER, PROGRAMMABLE CONTROLLER SYSTEM, DATA STORAGE METHOD, AND RECORDING MEDIUM

CROSS-REFERENCE TO RELATED APPLICATION

The present application is based on PCT filing PCT/JP2021/018148, filed May 13, 2021, the entire contents of which are incorporated herein by reference.

TECHNICAL FIELD

The present disclosure relates to a programmable controller, a programmable controller system, a data storage method, and a program.

BACKGROUND ART

In the field of factory automation (FA), a control device controls various machines and thereby achieves a line represented by production line, processing line, and inspection line. When any trouble occurs in running of a line, pieces of data indicating histories of control are analyzed to investigate causes of troubles. Some techniques for storing such pieces of data for use in control have been proposed (for example, refer to Patent Literature 1).

Patent Literature 1 discloses a technique for recording time-series device values into a temporary recording unit in the form of log data when a first trigger condition for a recording trigger is satisfied, and causing the log data retained in the ring buffer serving as the temporary recording unit to be stored into a storage memory when a second trigger condition for a storage trigger is satisfied. This technique can allow the log data to contribute to investigate causes of a trouble, by means of input of a storage trigger in response to occurrence of the trouble.

CITATION LIST

Patent Literature

Patent Literature 1: Unexamined Japanese Patent Application Publication No. 2020-134984

SUMMARY OF INVENTION

Technical Problem

The technique disclosed in Patent Literature 1 suffers from the limitation imposed by the capacity of the temporary recording unit as well as the limitation imposed by the capacity of the storage memory for finally storing the log data. In detail, in an exemplary case of a long period from generation of a recording trigger until occurrence of a trouble, or another case of multiple times of generation of recording triggers until occurrence of a trouble, the temporary recording unit is required to record a large volume of log data. Without a temporary recording unit having a sufficient capacity, the log data recorded in the temporary recording unit might be overwritten and lost before the actual occurrence of a trouble. This problem may make it difficult to investigate causes of the trouble.

An objective of the present disclosure, which has been accomplished under the above situations, is to further facilitate investigation of causes of troubles.

Solution to Problem

To achieve the above objective, a programmable controller according to the present disclosure is a programmable controller for controlling a machine and includes: data collecting means for repetitively collecting, from a memory, a piece of data that is variable depending on control of the machine; recording means for, when a predetermined first trigger condition is satisfied, recording into storage means a piece of data collected by the data collecting means at a timing corresponding to satisfaction of the first trigger condition; adding means for, when a second trigger condition different from the first trigger condition is satisfied, adding additional information to at least one of (i) a piece of first data that is the piece of data recorded by the recording means into the storage means or (ii) a piece of second data that is collected by the data collecting means after collection of the piece of first data and that is the piece of data recorded by the recording means into the storage means; and erasing means for, after the piece of first data and the piece of second data are recorded into the storage means, based on the additional information, erasing the piece of second data from the storage means while retaining the piece of first data in the storage means.

Advantageous Effects of Invention

According to the present disclosure, when the first trigger condition is satisfied, the recording means records the piece of data collected by the data collecting means into the storage means. This configuration enables avoidance of limitation imposed by the capacity of the temporary recording unit other than the storage means for finally storing pieces of data. In addition, when the second trigger condition is satisfied, the adding means adds the additional information to at least one of the piece of first data or the piece of second data. The erasing means erases the piece of second data from the storage means while retaining the piece of first data in the storage means on the basis of the additional information. This configuration can retain essential data in the storage means, while ensuring sufficient spaces for recording new pieces of data in the storage means, thereby saving a large number of histories of data on control. This configuration can therefore further facilitate investigation of causes of troubles.

DESCRIPTION OF EMBODIMENTS

A programmable controller according to embodiments of the present disclosure is described in detail below with reference to the accompanying drawings.

Embodiment 1

Figure 1:
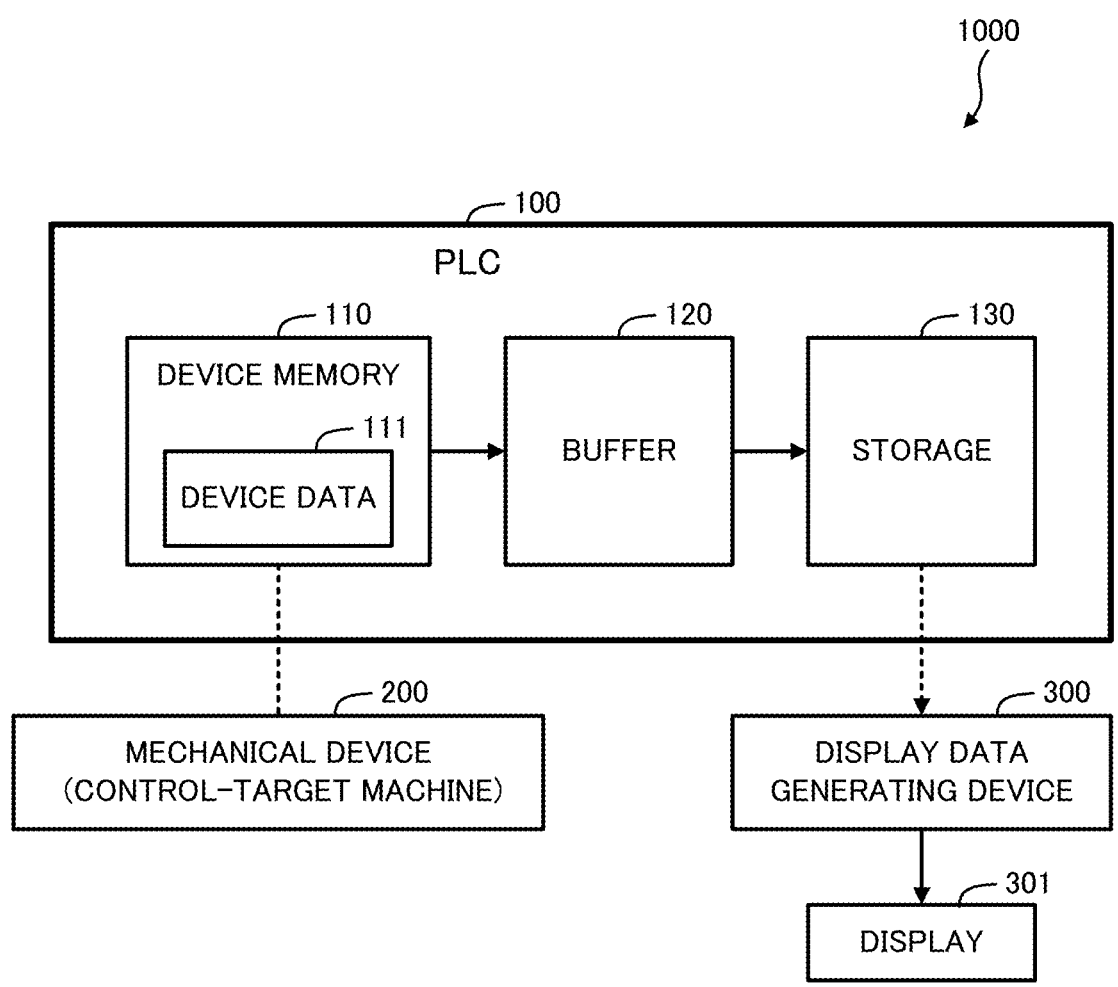
FIG. 1 illustrates a configuration of a PLC system according to Embodiment 1.

FIG. 1 illustrates a configuration of a programmable logic controller (PLC) system 1000 including a programmable controller according to an embodiment. The PLC system 1000 is a control system corresponding to a part of a fabrication system, an inspection system, or other processing system established in a facility represented by factory. In the PLC system 1000, a PLC 100 serving as a programmable controller controls a mechanical device 200 serving as a control-target machine connected to the PLC 100 via a communication line, and thereby runs a line. The PLC 100 includes a device memory 110 for control of the mechanical device 200, and a buffer 120 and a storage 130 to record logs of device data 111 stored in the device memory 110.

The device data 111 stored in the device memory 110 contains data synchronized with data stored in the mechanical device 200. The PLC 100 reads the device data 111 and thereby determines the status of the mechanical device 200, and overwrites the device data 111 and thereby changes the operation mode of the mechanical device 200, for example. The device data 111 may contain intermediate data that the PLC 100 uses in calculation steps for controlling the mechanical device 200, statistical data for management of the mechanical device 200, or other internal data, as well as the data synchronized with the data in the mechanical device 200. Examples of the mechanical device 200 include sensors, actuators, robots, and other FA machines installed in the line.

The PLC 100 causes logs of the device data 111 to be stored via the buffer 120 into the storage 130. The buffer 120 serves to absorb the difference in reading/writing speeds between the device memory 110 and the storage 130. The logs stored in the storage 130 are read by a display data generating device 300 connected to the PLC 100 via a communication line. The display data generating device 300 generates display data for use in investigation of causes of troubles from these logs. In accordance with the generated display data, a display 301 shows a display screen to a user. The display screen contains images indicating multiple pieces of data in such a form that the user can compare the pieces of data with each other.

The display data generating device 300 and the display 301 may respectively be an industrial personal computer (PC) connected to the PLC 100 and an accompanying liquid crystal display (LCD), or may be integrated into a tablet. Although the display data generating device 300 is disposed outside the PLC 100 in FIG. 1, the display data generating device 300 may also be one of the units constituting the PLC 100 of a building-block type.

Figure 2:
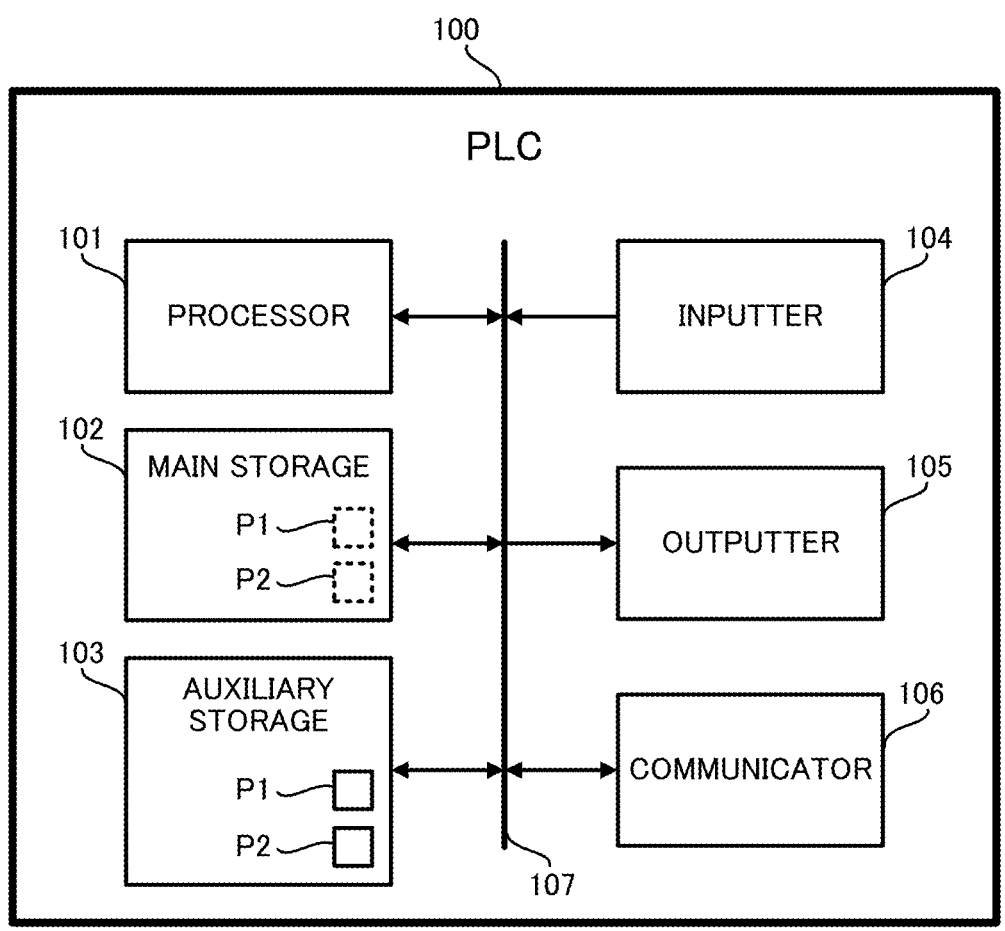
FIG. 2 illustrates a hardware configuration of a PLC according to Embodiment 1.

FIG. 2 is a schematic diagram illustrating a hardware configuration of the PLC 100. As illustrated in FIG. 2, the PLC 100 includes a processor 101, a main storage 102, an auxiliary storage 103, an inputter 104, an outputter 105, and a communicator 106. The main storage 102, the auxiliary storage 103, the inputter 104, the outputter 105, and the communicator 106 are each connected to the processor 101 via an internal bus 107.

The processor 101 includes a central processing unit (CPU) or a micro processing unit (MPU). The processor 101 executes a program P1 stored in the auxiliary storage 103, and thereby performs various functions and executes the processes described below. The processor 101 also executes a control program P2 stored in the auxiliary storage 103 and thereby controls the mechanical device 200. The control program P2 may be a ladder program or a binary file in an executable form generated from source codes written in a high-level language represented by C language, for example.

The main storage 102 includes a random access memory (RAM). In the main storage 102, the program P1 and the control program P2 are loaded from the auxiliary storage 103. The main storage 102 is then used as a work area for the processor 101.

The auxiliary storage 103 includes a non-volatile memory represented by electrically erasable programmable read-only memory (EEPROM) or hard disk drive (HDD). The auxiliary storage 103 stores various types of data to be used in processing at the processor 101, as well as the program P1 and the control program P2. The auxiliary storage 103 feeds the processor 101 with data to be used at the processor 101, in accordance with instructions from the processor 101. The auxiliary storage 103 also stores data fed from the processor 101.

The inputter 104 includes an input device represented by hardware switch, input key, or pointing device. The inputter 104 acquires information input from the user and informs the processor 101 of the acquired information.

The outputter 105 includes an output device represented by light emitting diode (LED), liquid crystal display (LCD), or speaker. The outputter 105 presents various information to the user, in accordance with instructions from the processor 101.

The communicator 106 includes a network interface circuit for communication with external apparatuses. The communicator 106 receives signals from the outside and outputs data indicated by the received signals to the processor 101. The communicator 106 also transmits signals indicating data output from the processor 101 to external apparatuses.

In the case where the PLC 100 is a programmable controller of a building-block type, the individual units included in the PLC 100 may each have some or all of the hardware components illustrated in FIG. 2 and may be connected to each other via system buses.

Figure 3:
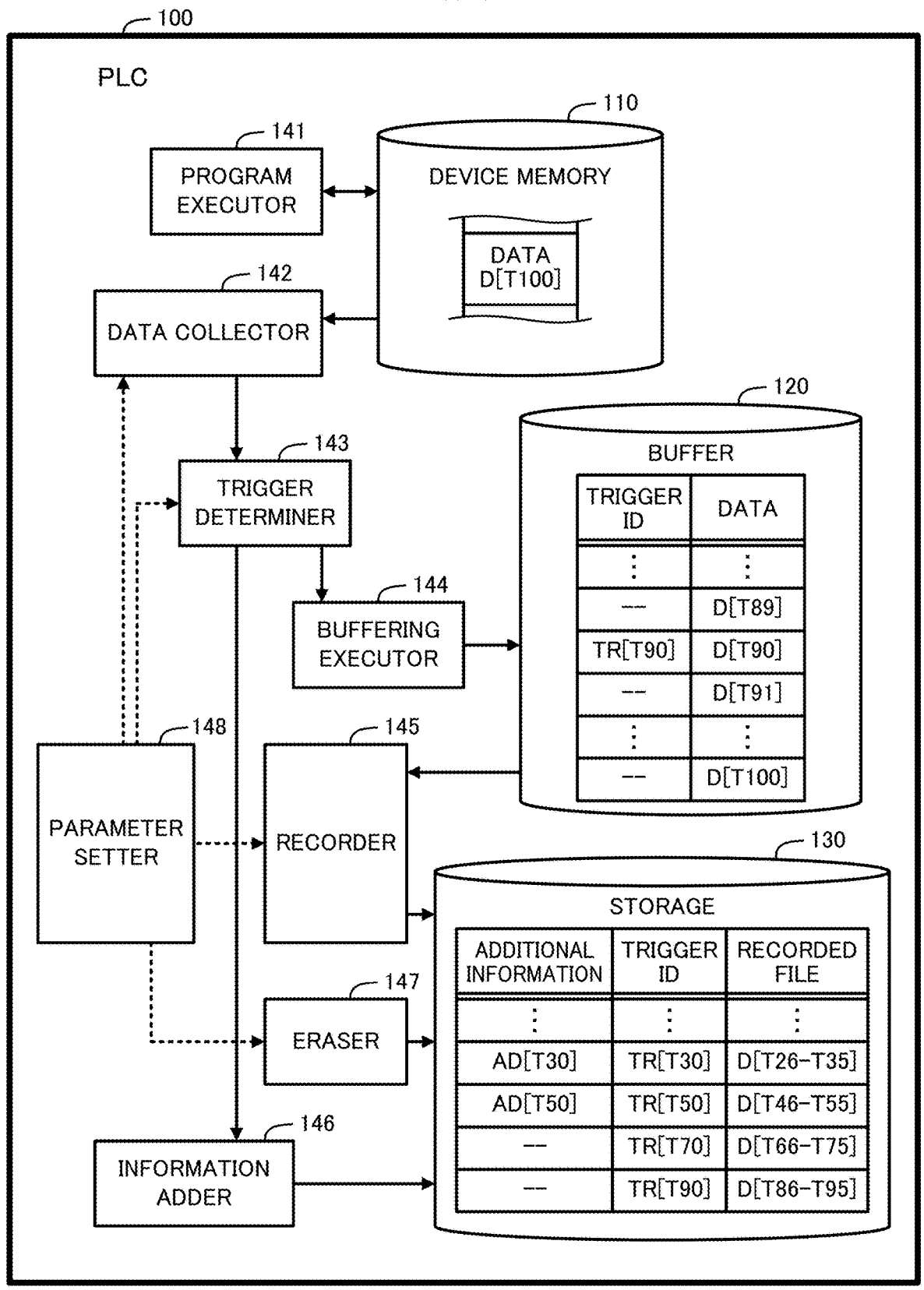
FIG. 3 illustrates a functional configuration of the PLC according to Embodiment 1.

The above-described hardware components cooperate with each other and thereby allow the PLC 100 to perform a function of logging device data. In detail, as illustrated in FIG. 3, the PLC 100 has functional components including a program executor 141 to execute the control program P2, a device memory 110 to store pieces of data variable depending on control of the mechanical device 200, a data collector 142 to repetitively collect the pieces of data stored in the device memory 110, a trigger determiner 143 to determine the existence of triggers related to storage of data, a buffering executor 144 to record the collected pieces of data into the buffer 120, the buffer 120 to temporarily store the pieces of data, a recorder 145 to read a piece of data from the buffer 120 and record the piece of data into the storage 130, the storage 130 to store pieces of data, an information adder 146 to add additional information (described below) to a piece of data recorded in the storage 130, an eraser 147 to erase a piece of data without additional information after elapse of a certain storage period, and a parameter setter 148 to set various parameters.

The program executor 141 is mainly achieved by the processor 101. The program executor 141 repetitively executes the steps prescribed in the control program P2, and thereby controls the mechanical device 200 by means of the pieces of data in the device memory 110.

The device memory 110 is mainly achieved by the main storage 102. The pieces of data in the device memory 110 are variable depending on execution of the control program P2 at the program executor 141. For one example, the execution of the control program P2 causes a piece of data indicating a value sensed at a mechanical device 200 serving as a sensor to be acquired and updated at regular intervals. For another example, the execution of the control program P2 causes a piece of data indicating a rotational angle of a stepping motor included in a mechanical device 200 serving as an actuator to be updated at a desired timing of providing an operational instruction to the mechanical device 200. In the example illustrated in FIG. 3, a piece of data D[T100] is recorded in the device memory 110. The word "T100" indicates a specific time point, and the word "D[T100]" indicates a value of data at the time T100.

The data collector 142 is mainly achieved by the processor 101. The data collector 142 repetitively reads pieces of data from an area of a predetermined address in the device memory 110 in a predetermined cycle, and outputs the read pieces of data to the trigger determiner 143. The predetermined cycle is a scan time corresponding to a single execution of the control program P2 at the program executor 141, for example. The data collector 142 corresponds to an example of data collecting means, in the PLC 100, for repetitively collecting, from the device memory 110 serving as a memory, a piece of data that is variable depending on control of a machine.

The trigger determiner 143 is mainly achieved by the processor 101. The trigger determiner 143 determines whether a first trigger condition for recording of a piece of data into the storage 130 is satisfied, and whether a second trigger condition for extension of a storage period for the piece of data recorded in the storage 130 is satisfied.

The first trigger condition and the second trigger condition are preliminarily set at the parameter setter 148. The first and second trigger conditions are different from each other. The first and second trigger conditions are satisfied in response to, for example, detection of a change from the off state into the on state of a designated bit value among the device data, detection of continuation of a bit value in the on state for a period longer than a threshold period, detection of changes of multiple bit values into the on states in a designated order, detection of a change from dissatisfaction to satisfaction of a condition related to a numerical value indicated by the device data, or any combination thereof.

These first and second trigger conditions are mere example and may also be other conditions. Each of the first and second trigger conditions may be determined to be satisfied on the basis of determination on a piece of data to be collected or a piece of data not to be collected among the device data, or may be satisfied regardless of the device data. For example, each of the first and second trigger conditions may be satisfied when the PLC 100 receives a trigger signal from the outside.

The trigger determiner 143 outputs a piece of data collected by the data collector 142 to the buffering executor 144. When determining that the first trigger condition is satisfied, the trigger determiner 143 outputs the piece of data in association with a trigger ID indicating satisfaction of the first trigger condition, to the buffering executor 144.

When determining that the second trigger condition is satisfied, the trigger determiner 143 informs the information adder 146 of the trigger ID. The second trigger condition is a condition requiring for extension of a storage period of a piece of data, which is determined to be recorded into the storage 130 because of satisfaction of the first trigger condition, in comparison to a storage period in the case of dissatisfaction of the second trigger condition. When the second trigger condition is satisfied, the trigger ID is used to identify a piece of data subject to extension of the storage period.

The buffering executor 144 is mainly achieved by the processor 101. The buffering executor 144 sequentially records pieces of data output from the trigger determiner 143 into the buffer 120. When receiving the trigger ID in the case of satisfaction of the first trigger condition, the buffering executor 144 records this trigger ID in association with the corresponding piece of data into the buffer 120.

The buffer 120 is a ring buffer mainly achieved by the main storage 102. In the example illustrated in FIG. 3, the buffer 120 stores pieces of data D[T89], D[T90], D[T91], . . . , and D[T100] in sequence, and the piece of data D[T90] is provided with a trigger ID TR[T90]. The trigger ID TR[T90] indicates satisfaction of the first trigger condition for recording of the piece of data D[T90] into the storage 130. The buffer 120 corresponds to an example of a buffer, in the PLC 100, to sequentially store a plurality of the pieces of data collected by the data collecting means.

The recorder 145 is mainly achieved by the processor 101. The recorder 145 checks for the existence a piece of data provided with a trigger ID in the buffer 120 at predetermined constant time intervals. When finding out a new piece of data provided with a trigger ID, the recorder 145 reads a series of data containing the new piece of data together with the trigger ID from the buffer 120. The series of data is successively collected pieces of data, from a piece of data collected earlier than the piece of data provided with the trigger ID by a predetermined number of pieces of data, to a piece of data collected later than the piece of data provided with the trigger ID by a predetermined number of pieces of data. The recorder 145 then records a file containing the read series of data into the storage 130 in association with the read trigger ID. In the example illustrated in FIG. 3, the recorder 145 finds out the piece of data D[T90] provided with the trigger ID TR[T90], and records a file D[T86-T95] containing a collection of pieces of data D[T86] to D[T95] into the storage 130. The recorder 145 corresponds to an example of recording means, in the PLC 100, for, when the predetermined first trigger condition is satisfied, recording into storage means a piece of data collected by the data collecting means at a timing corresponding to satisfaction of the first trigger condition.

The storage 130 is mainly achieved by the auxiliary storage 103 or a removable memory card.

The information adder 146 is mainly achieved by the processor 101. When the trigger determiner 143 notifies the information adder 146 of the trigger ID in the case of satisfaction of the second trigger condition, the information adder 146 searches for a file provided with this trigger ID in the storage 130. The information adder 146 then adds additional information to the file retrieved as a result of searching. The additional information corresponds to a mark for extension of a storage period for a file provided with this additional information in comparison to a storage period for a file without additional information. The addition of additional information may be insertion of a mark to the end of a file, addition of a specific character string to the file name, or addition of a folder attribute indicating a folder to accommodate the file, for example. In the example illustrated in FIG. 3, additional information AD[T30] is added to a file D[T26-T35] provided with a trigger ID TR[T30], and additional information AD[T50] is added to a file D[T46-T55] provided with a trigger ID TR[T50]. The information adder 146 corresponds to an example of adding means in the PLC 100. When the second trigger condition is satisfied, the adding means adds additional information to a piece of data recorded by the recording means into the storage means.

Figure 4:
FIG. 4 is a diagram for describing erasing of files by an eraser according to Embodiment 1.

The eraser 147 is mainly achieved by the processor 101. The eraser 147 scans the files recorded by the recorder 145 into the storage 130 at predetermined constant time intervals, and erases a file that has expired the storage period among the files without additional information, from the storage 130, together with the trigger ID associated with this file. The erasing of a file from the storage 130 may be deletion or displacement of data resulting in generation of a free space, or may be overwriting of the file with another file. The storage period of a file without additional information has a length of one day or one week, for example. FIG. 4 illustrates that the eraser 147 erases files without additional information and thereby generates free spaces.

The eraser 147 may also erase a file that has expired the storage period among the files provided with the additional information, from the storage 130, together with the trigger ID and the additional information associated with this file. The storage period for a file provided with the additional information is longer than that of the storage period for a file without additional information, for example, a period of one month or one year. The eraser 147 corresponds to an example of erasing means, in the PLC 100, for erasing a piece of data from the storage means.

The parameter setter 148 is mainly achieved by cooperation of the processor 101 and the inputter 104. The parameter setter 148 acquires parameters input from the user and sets the acquired parameters in the data collector 142, the trigger determiner 143, the recorder 145, and the eraser 147. The parameters set at the parameter setter 148 include the address of a piece of data to be collected in the device memory 110, a cycle of data collection, the contents of the first and second trigger conditions, information for generation of trigger IDs, a time interval of causing the recorder 145 to scan the buffer 120, the number of data pieces from the piece of data corresponding to the start of a file to the piece of data to be provided with a trigger ID, the number of data pieces from the piece of data corresponding to the end of a file to the piece of data to be provided with a trigger ID, time intervals of causing the eraser 147 to scan the files in the storage 130, the lengths of the respective storage periods for a file provided with additional information and a file without additional information, and the content of a file operation to erase a file. The information for generation of trigger IDs may be an address of device data at which a value serving as a trigger ID is recorded, or an instruction to apply a time to a trigger ID, for example. The content of a file operation may be selection of deletion or displacement of a file, or a location of the file after displacement, for example.

The PLC 100 executes processes, which are described in detail below with reference to FIGS. 5 to 9.

Figure 5:
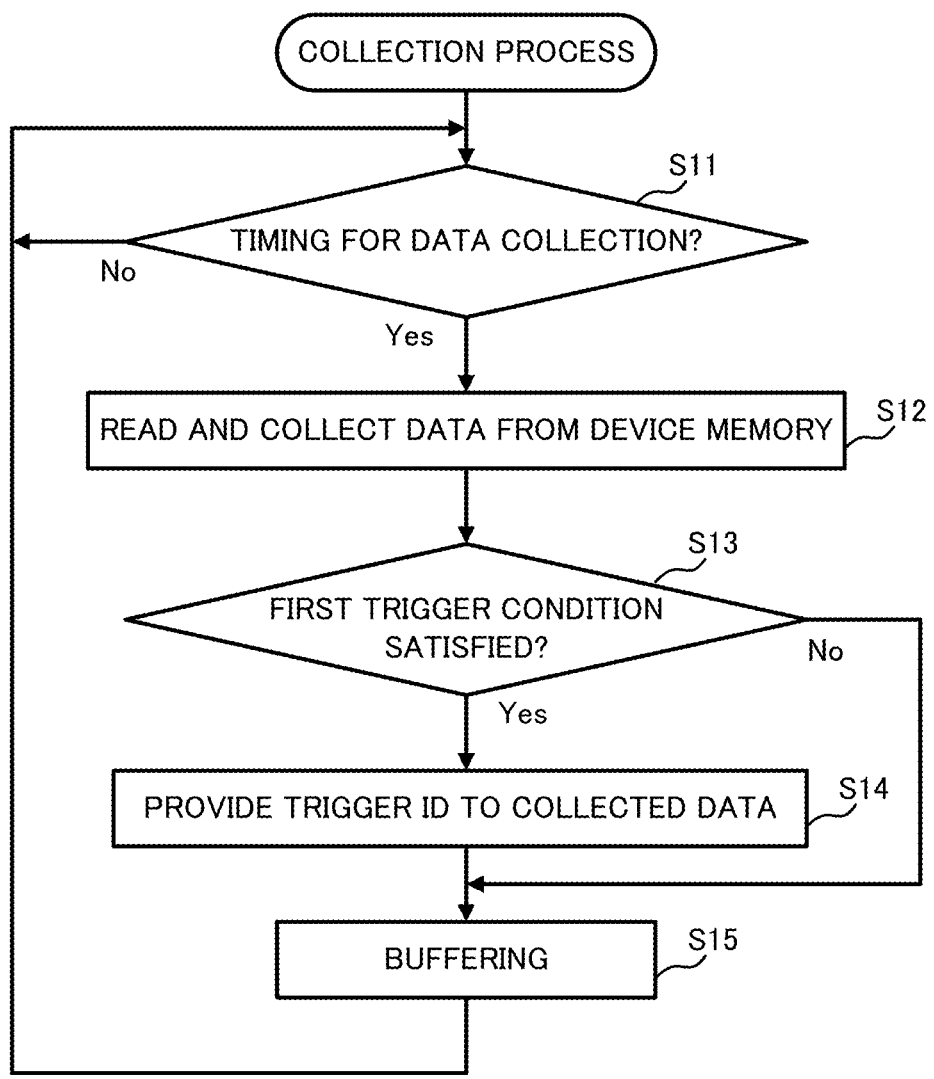
FIG. 5 is a flowchart illustrating a collection process according to Embodiment 1.

FIG. 5 illustrates steps of a collection process in which the PLC 100 collects a piece of data from the device memory 110. This collection process may be started at the same time as execution of a specific application in response to an operation of the user, or may be started at the same time as execution of the control program P2.

In the collection process, the data collector 142 determines whether the current time is a timing for data collection (Step S11). Specifically, the data collector 142 determines whether a period corresponding to the collection cycle set at the parameter setter 148 has elapsed since the previous timing of collecting a piece of data. The collection cycle has a length of one millisecond or one second, for example. In the first execution of the determination in Step S11 since the start of the collection process, the determination in Step S11 may always result in a positive outcome regardless of the existence of the previous collection, or the process may skip the determination in Step S11.

When the current time is determined not to have reached a timing for data collection (Step S11; No), the PLC 100 repeats the determination in Step S11 and waits until a timing for data collection. In contrast, when the current time is determined to be a timing for data collection (Step S11; Yes), the data collector 142 reads and collects a piece of data recorded at the address set at the parameter setter 148, from the device memory 110 (Step S12).

The trigger determiner 143 then determines whether the first trigger condition is satisfied (Step S13). In an exemplary case where the first trigger condition is satisfied in response to acquisition of a sensing result indicating completion of transfer of a single product on a belt conveyor in the final stage of a fabrication process, the trigger determiner 143 determines whether fabrication of a single product is completed in the fabrication process.

When determining that the first trigger condition is satisfied (Step S13; Yes), the trigger determiner 143 provides the piece of data collected in Step S12 with a trigger ID, and outputs the piece of data to the buffering executor 144 (Step S14). The trigger ID corresponds to the serial number of a fabricated product on a one-to-one basis, for example. In contrast, when determining that the first trigger condition is not satisfied (Step S13; No), the trigger determiner 143 outputs the collected piece of data as it is to the buffering executor 144, without providing a trigger ID to the collected piece of data, and then proceeds to Step S15.

After Step S14, the buffering executor 144 buffers the piece of data (Step S15). Specifically, the buffering executor 144 records the piece of data output from the trigger determiner 143 into the buffer 120, together with the trigger ID in the case of the piece of data provided with the trigger ID.

The process then repeats Step S11 and the following steps. These steps cause pieces of data to be recorded into the buffer 120 after every reading of a piece of data to be collected from the device memory 110. The read piece of data is provided with a trigger ID when the first trigger condition is satisfied.

Figure 6:
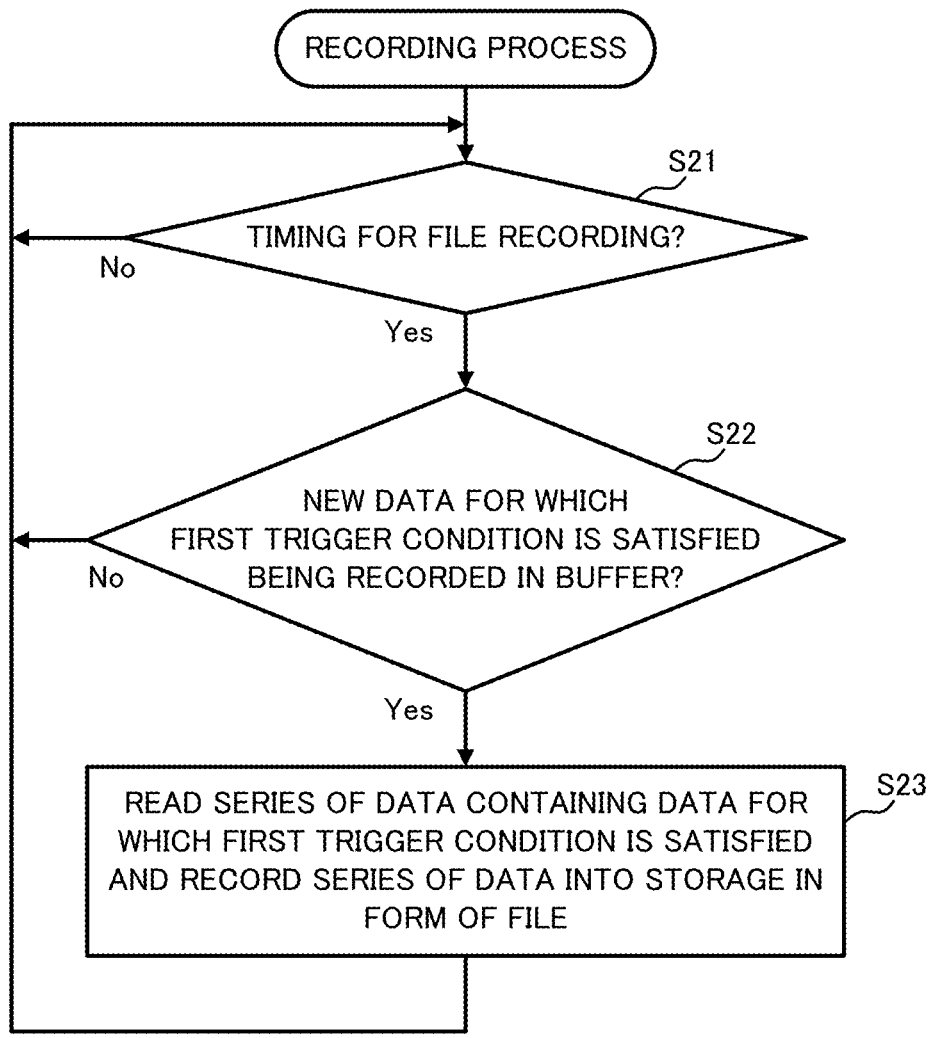
FIG. 6 is a flowchart illustrating a recording process according to Embodiment 1.

FIG. 6 illustrates steps of a recording process in which the PLC 100 generates a file corresponding to satisfaction of the first trigger condition from pieces of data in the buffer 120 and records the file into the storage 130. This recording process is started at the same time as the collection process illustrated in FIG. 5.

In the recording process, the recorder 145 determines whether the current time is a timing for file recording (Step S21). Specifically, the recorder 145 determines whether a period corresponding to the time interval set at the parameter setter 148 has elapsed since the previous timing of recording a file into the storage 130. This time interval has a length of ten milliseconds or ten seconds, for example. In the first execution of the determination in Step S21 since the start of the recording process, the determination in Step S21 may always result in a positive outcome regardless of the existence of the previous recording, or the process may skip the determination in Step S21.

When the current time is determined not to have reached a timing for file recording (Step S21; No), the PLC 100 repeats the determination in Step S21 and waits until a timing for file recording. In contrast, when the current time is determined to be a timing for file recording (Step S21; Yes), the recorder 145 determines whether a new piece of data for which the first trigger condition is satisfied exists in the buffer 120 (Step S22). Specifically, the recorder 145 scans the buffer 120 and searches for an unconfirmed piece of data provided with a trigger ID.

When determining that no new piece of data exists in the buffer 120 (Step S22; No), the recorder 145 repeats Step S21 and the following steps. In contrast, when determining that a new piece of data exists in the buffer 120 (Step S22; Yes), the recorder 145 reads a series of data containing the piece of data for which the first trigger condition is satisfied from the buffer 120, and records the series of data into the storage 130 in the form of a file (Step S23). Specifically, the recorder 145 generates a file containing the new piece of data provided with the trigger ID and found out in Step S22, and one or more successive pieces of data preceding and following the new piece of data, of which the number is set at the parameter setter 148, and then records the generated file into the storage 130 in association with the trigger ID.

The recorder 145 then repeats Step S21 and the following steps. These steps cause chronological pieces of data preceding and following the piece of data recorded together with the trigger ID in the buffer 120 to be repetitively read, and cause a file indicating the chronological pieces of data to be recorded into the storage 130.

Figure 7:
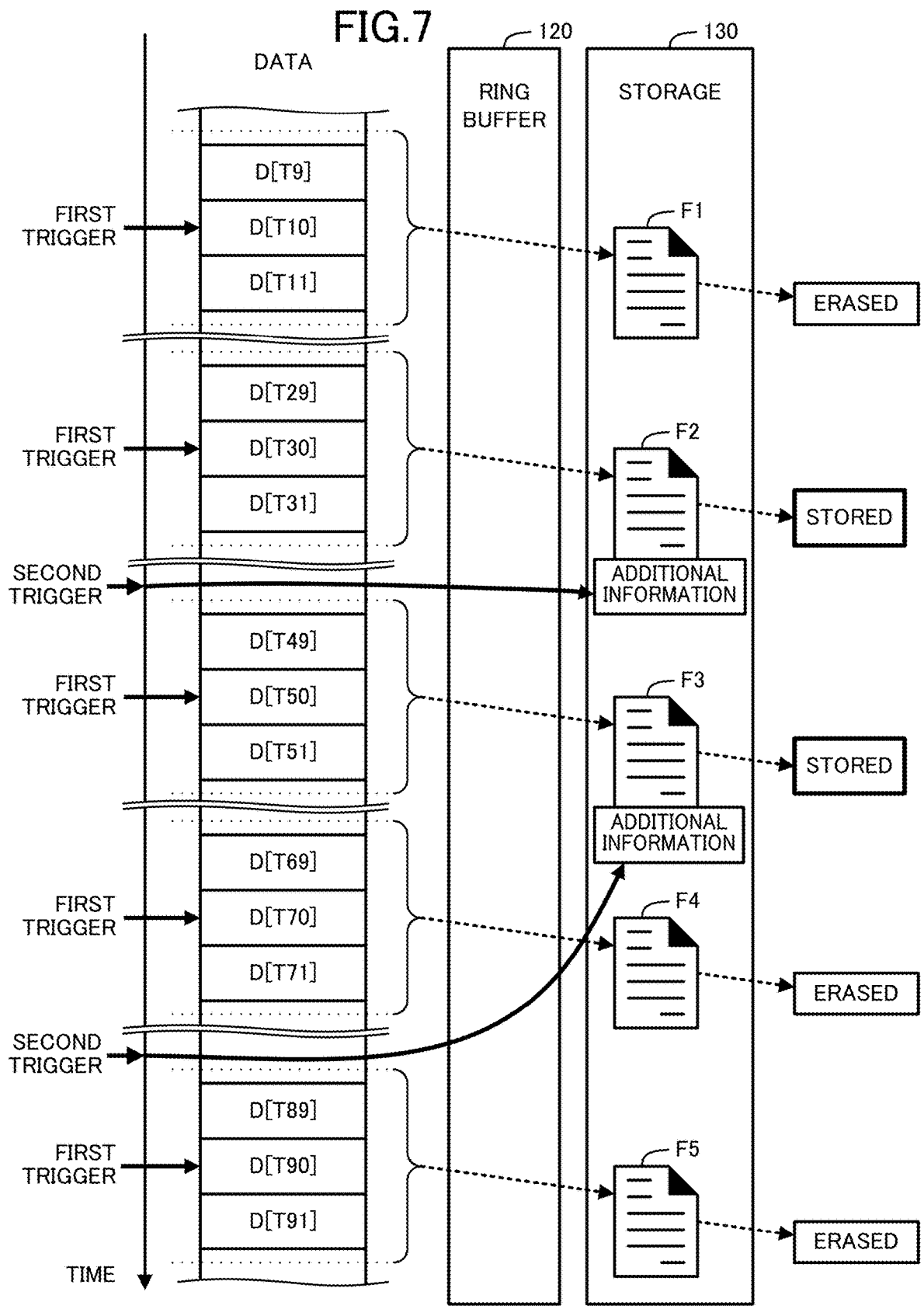
FIG. 7 is a diagram for describing storage and erasing of files according to Embodiment 1.

FIG. 7 is a schematic diagram illustrating recording of files into the storage 130 through execution of the collection process and the recording process. The arrows "first trigger" in the left portion of FIG. 7 each indicate a piece of data for which the first trigger condition is satisfied. In the example illustrated in FIG. 7, each of files F1 to F5 is generated from pieces of data containing the piece of data for which the first trigger condition is satisfied, and is stored into the storage 130.

Figure 8:
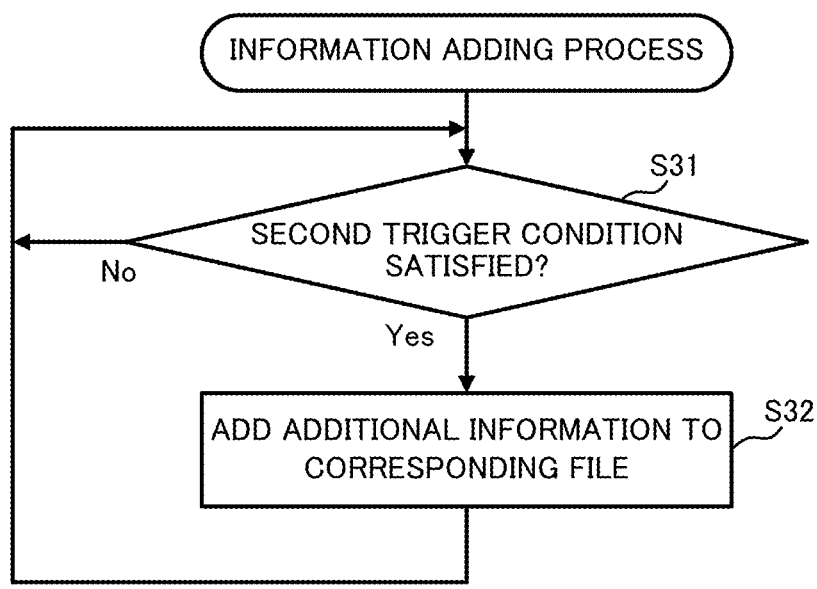
FIG. 8 is a flowchart illustrating an information adding process according to Embodiment 1.

FIG. 8 illustrates an information adding process in which the PLC 100 adds additional information to a file recorded in the storage 130. This information adding process is started at the same time as the collection process illustrated in FIG. 5.

In the information adding process, the trigger determiner 143 determines whether the second trigger condition is satisfied (Step S31). In an exemplary case where the second trigger condition is satisfied in response to detection of a non-conforming product in an inspection process after the fabrication process, the trigger determiner 143 determines the existence of abnormality in a product fabricated in the fabrication process.

When determining that the second trigger condition is not satisfied (Step S31; No), the trigger determiner 143 repeats the determination in Step S31. In contrast, when the second trigger condition is determined to be satisfied (Step S31; Yes), the information adder 146 adds additional information to the file corresponding to the satisfaction of the second trigger condition in Step S31 (Step S32). Specifically, the information adder 146 adds additional information to the file provided with the trigger ID presented from the trigger determiner 143.

The process then repeats Step S31 and the following steps. These steps cause additional information to be added to each of the files for which the second trigger condition is satisfied. In the example illustrated in FIG. 7, the arrows "second trigger" each indicate satisfaction of the second trigger condition, and additional information is added to the files F2 and F3.

Figure 9:
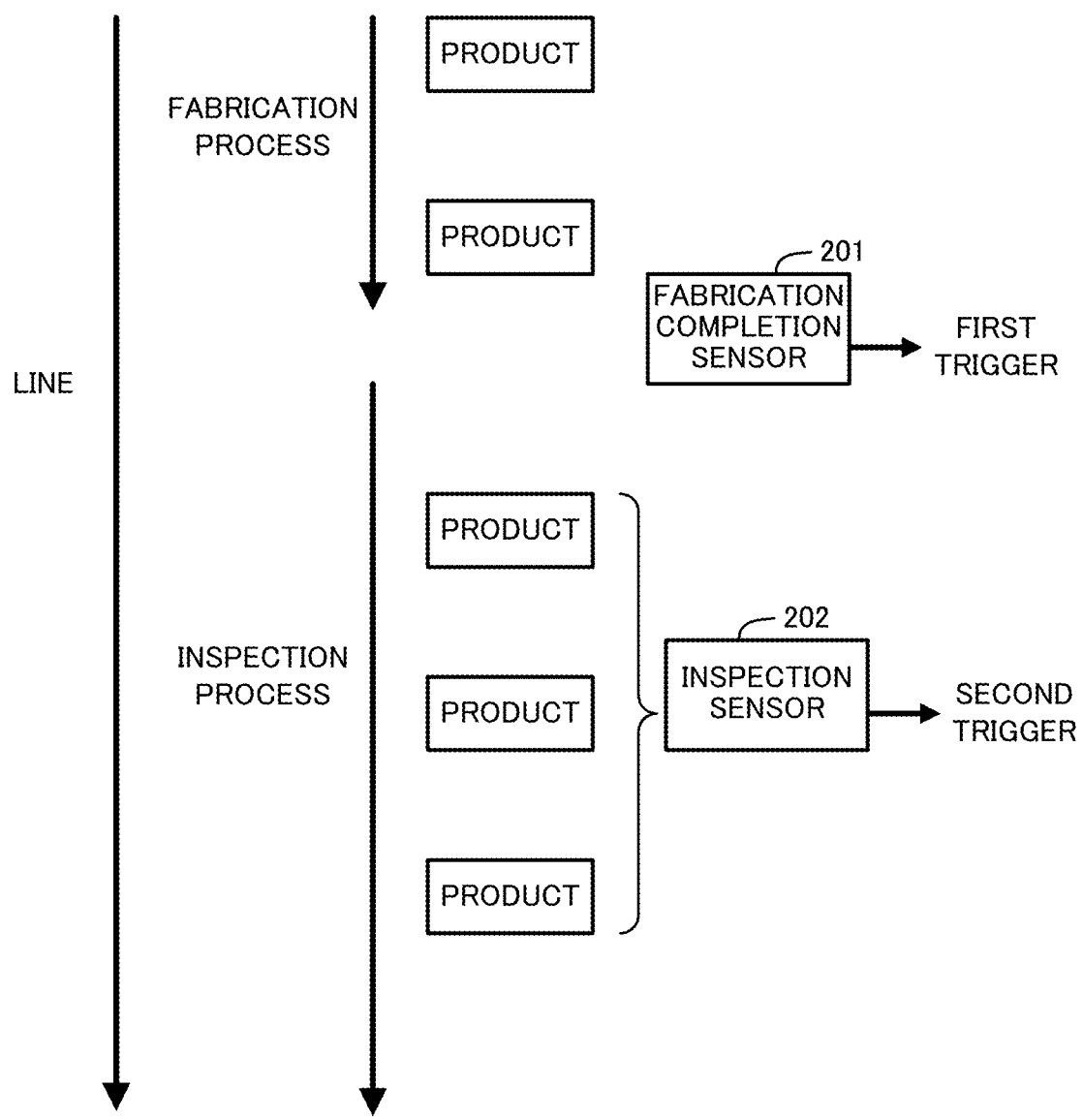
FIG. 9 is a diagram for describing timings of satisfaction of a first trigger condition and a second trigger condition according to Embodiment 1.

As illustrated in FIG. 7, a file provided with additional information in response to satisfaction of the second trigger condition is not necessarily the file recorded into the storage 130 immediately before the satisfaction of the second trigger condition. The additional information may be added to a file several number of files earlier than the file corresponding to satisfaction of the second trigger condition. FIG. 9 illustrates an example, which assumes that the fabrication process involves fabrication of a product one by one, followed by determination of whether the first trigger condition is satisfied on the basis of a signal output from a fabrication completion sensor 201, while the subsequent inspection process involves examining three products at once at an inspection sensor 202, followed by determination of whether the second trigger condition is satisfied. In this example, the cycle of determining whether the first trigger condition is satisfied differs from the cycle of determining whether the second trigger condition is satisfied. Furthermore, one of the three products for which the second trigger condition is satisfied may be a product corresponding to the last satisfaction of the first trigger condition, a product corresponding to the second-to-last satisfaction of the first trigger condition, or a product corresponding to the third-to-last satisfaction of the first trigger condition.

Figure 10:
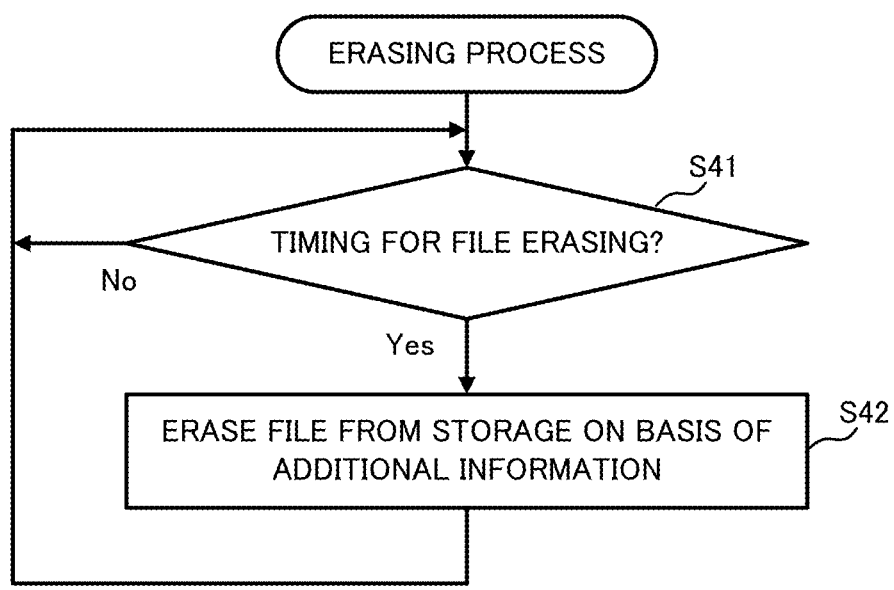
FIG. 10 is a flowchart illustrating an erasing process according to Embodiment 1.

FIG. 10 illustrates an erasing process in which the PLC 100 erases a file from the storage 130. This erasing process is started at the same time as the collection process illustrated in FIG. 5.

In the erasing process, the eraser 147 determines whether the current time is a timing for file erasing (Step S41). Specifically, the eraser 147 determines whether a period corresponding to the time interval set at the parameter setter 148 has elapsed since the previous timing of erasing a file. This time interval has a length of one minute or one hour, for example. In the first execution of the determination in Step S41 since the start of the erasing process, the determination in Step S41 may always result in a positive outcome regardless of the existence of the previous timing for file erasing, or the process may skip the determination in Step S41.

When the current time is determined not to have reached a timing for file erasing (Step S41; No), the eraser 147 repeats the determination in Step S41 and waits until a timing for file erasing. In contrast, when the current time is determined to be a timing for file erasing (Step S41; Yes), the eraser 147 erases a file from the storage 130 on the basis of the additional information (Step S42). Specifically, the eraser 147 scans the files recorded in the storage 130 and, when any of the files provided with additional information and the files without additional information has expired a corresponding storage period, erases the file.

The process then repeats Step S41 and the following steps. These steps cause a file provided with additional information and a file without additional information to be erased from the storage 130 at respective specific timings of the ends of the storage periods. For example, the specific timings may be a timing after elapse of at least a predetermined period since storage of a file into the storage 130, or a timing after elapse of at least a predetermined period since satisfaction of the first trigger condition or the second trigger condition. For example, a file provided with additional information may be retained in the storage 130 for a long period of at least one year since storage of this file into the storage 130, while a file without additional information may be deleted after elapse of at least one day since satisfaction of the first trigger condition in order to ensure sufficient free spaces. Alternatively, the specific timings may be a timing when the number or amount of the pieces of data stored in the storage 130 exceeds a threshold. For example, files provided with additional information may be deleted in the chronological order when the usage of the storage 130 exceeds 90%, while files without additional information may be deleted in the chronological order when the number of such files stored in the storage 130 exceeds ten because the latest ten files are deemed to be sufficient.

As described above, the recorder 145 records a piece of data collected by the data collector 142 into the storage 130 when the first trigger condition is satisfied. This configuration enables avoidance of limitation imposed by the capacity of the buffer 120 other than the storage 130 for finally storing pieces of data. In addition, when the second trigger condition is satisfied, the information adder 146 adds additional information to a file designated by the trigger ID, and the eraser 147 erases, from the storage 130, a file excluded from the targets to be provided with additional information by the information adder 146, while retaining files provided with the additional information in the storage 130. This configuration can retain essential data in the storage 130, while ensuring sufficient spaces for recording new files in the storage 130, thereby saving a large number of histories of data related to control. The configuration can therefore further facilitate investigation of causes of troubles.

The specific timing of erasing a file without additional information by the eraser 147 is a timing after elapse of at least a predetermined period since storage of the file into the storage 130, or a timing after elapse of at least a predetermined period since satisfaction of the first trigger condition for this file, or a timing the number or amount of the pieces of data stored in the storage 130 exceeds a threshold. This configuration allows the file without additional information to be retained in the storage 130 for a period desired by the user of the PLC 100 and then deleted.

Embodiment 2

Embodiment 2 is described below focusing on the differences from Embodiment 1. The component identical or corresponding to that in Embodiment 1 is provided with the same reference sign. Embodiment 2 differs from Embodiment 1 in that the information adder 146 also adds additional information to pieces of data in the buffer.

The description of Embodiment 1 is directed to an example in which the information adder 146 searches in the storage 130 for a file provided with the trigger ID presented from the trigger determiner 143. In some conceivable cases, however, the file provided with the trigger ID presented from the trigger determiner 143 has not yet been stored into the storage 130 due to a low speed of writing data into the storage 130.

Figure 11:
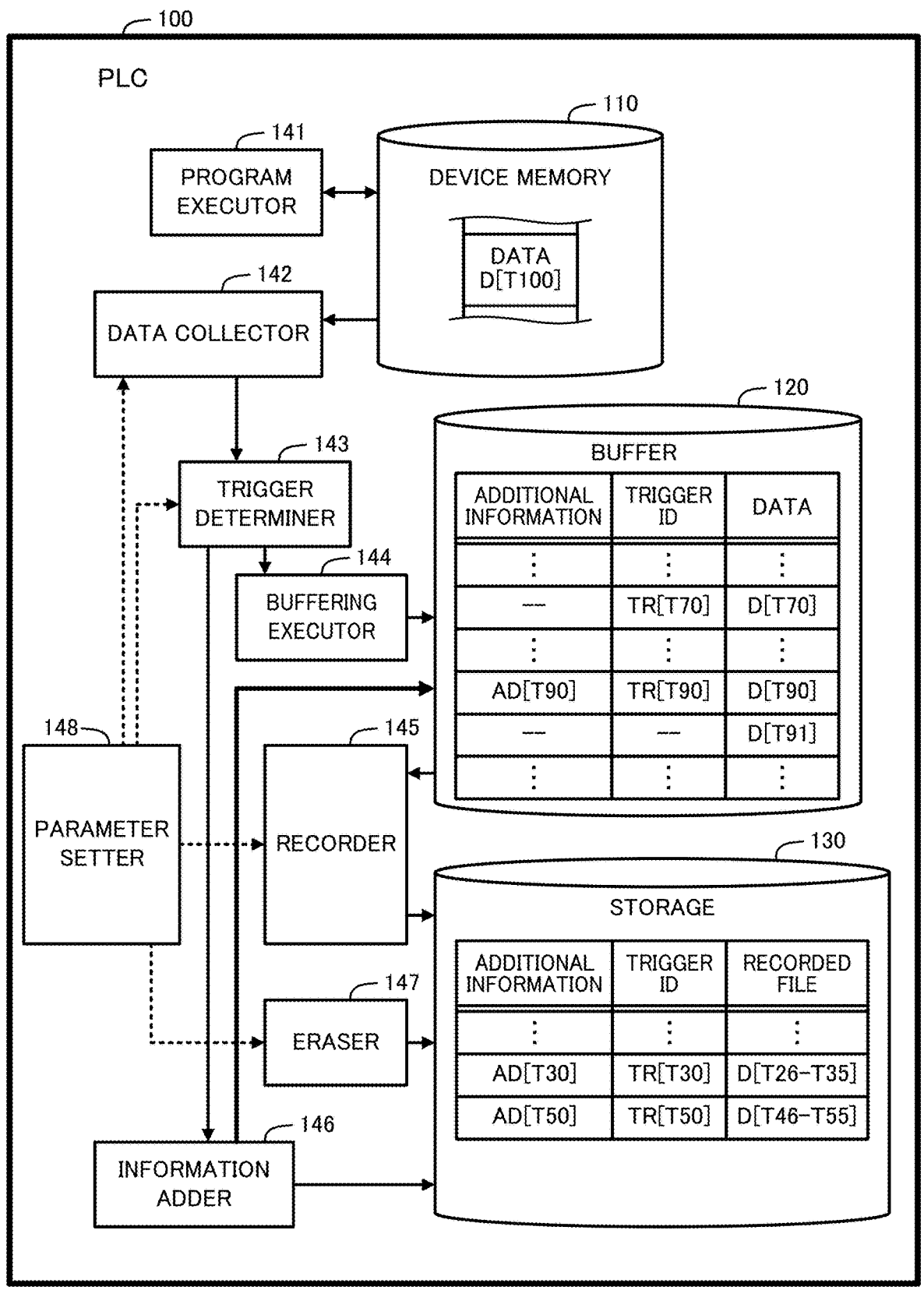
FIG. 11 illustrates a functional configuration of a PLC according to Embodiment 2.

In such cases, the information adder 146 according to the embodiment also searches for the trigger ID in the pieces of data stored in the buffer 120, as illustrated with the thick-line arrows in FIG. 11, and adds additional information to a retrieved piece of data provided with the trigger ID.

The recorder 145 records a file containing the piece of data provided with the trigger ID into the storage 130 in such a manner that the additional information added to the file. The file provided with the additional information is more important than a file without additional information, and is thus preferably recorded into the storage 130 before the file is lost due to data update at the buffer 120 serving as a ring buffer. The recorder 145 causes the file containing the piece of data provided with the additional information in the buffer 120 to be recorded into the storage 130 in priority to a file containing a piece of data without additional information. For example, as illustrated in FIG. 11, the recorder 145 reads a piece of data D[T90] provided with both of the trigger ID and the additional information in advance of a piece of data D[T70] provided with the trigger ID but not provided with the additional information. The recorder 145 then records the file containing the piece of data D[T90] into the storage 130 in advance of the file containing the piece of data D[T70].

As described above, the recorder 145 sequentially reads pieces of data provided with trigger IDs from the buffer 120 and records the files into the storage 130, such that a piece of data provided with additional information is read from the buffer 120, followed by recording a file containing the piece of data into the storage 130, in priority to other pieces of data collected before collection of the piece of data but not provided with additional information. This configuration can prevent a piece of data with additional information that should be retained for a long period in the storage 130 from being lost due to data update in the buffer 120. The information adder 146 according to the embodiment corresponds to another example of adding means for adding the additional information to a piece of first data among the piece of first data and a piece of third data collected before collection of the piece of first data and recorded in the buffer, when the second trigger condition is satisfied.

Embodiment 3

Embodiment 3 is described below focusing on the differences from Embodiment 1. The component identical or corresponding to that in Embodiment 1 is provided with the same reference sign. Embodiment 3 differs from Embodiment 1 in that the information adder 146 adds additional information to not only the file for which the second trigger condition is satisfied but also files recorded into the storage 130 before and after recording of the file.

The file provided with additional information indicates a transition of the device data. In the case where satisfaction of the first trigger condition corresponds to completion of fabrication of a single product and satisfaction of the second trigger condition corresponds to detection of abnormality in the product, the user also demands to check for transitions of the device data related to products fabricated before and after fabrication of the product determined to have abnormality.

Figure 12:
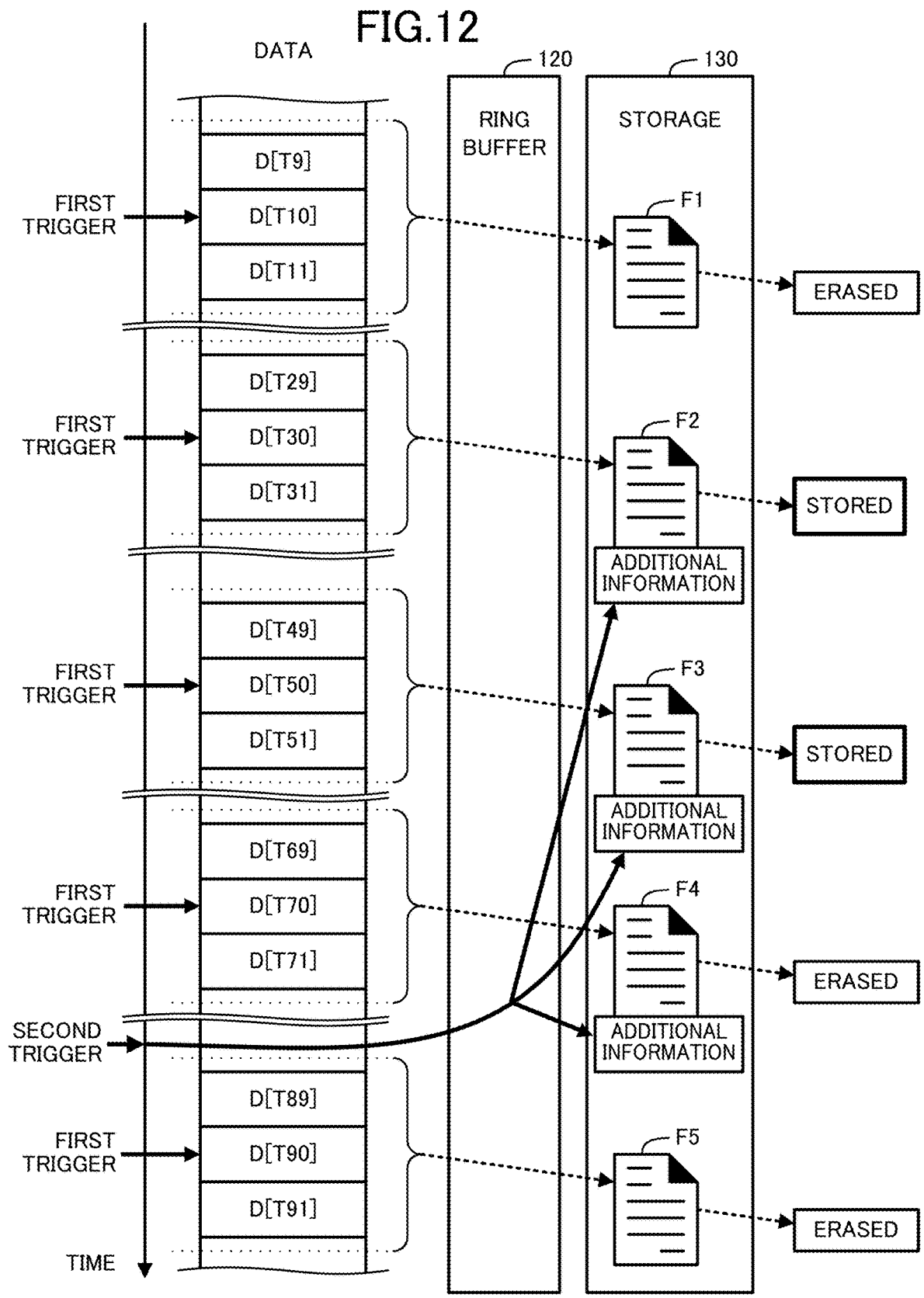
FIG. 12 is a diagram for describing addition of additional information according to Embodiment 3.

In order to meet such a demand, the information adder 146 according to the embodiment adds additional information to not only the file F3 provided with the trigger ID presented from the trigger determiner 143 in response to satisfaction of the second trigger condition, but also the file F2 recorded into the storage 130 immediately before the file F3, and the file F4 recorded into the storage 130 immediately after the file F3, as illustrated in FIG. 12.

This configuration extends the storage periods for the files F2 and F4, and is expected to facilitate investigation of causes of troubles. The information adder 146 according to the embodiment corresponds to another example of adding means for adding the additional information to the piece of first data and a piece of fourth data recorded into the storage 130 in response to at least one of (i) a previous satisfaction of the first trigger condition occurring previous to satisfaction of the first trigger condition corresponding to the piece of first data or (ii) a subsequent satisfaction of the first trigger condition occurring subsequent to the satisfaction of the first trigger condition corresponding to the piece of first data.

The files to which the information adder 146 adds additional information illustrated in FIG. 12 are mere examples. The information adder 146 may also add additional information to the file F1, and may also add additional information to the file F5. Alternatively, the information adder 146 may add additional information to one or more successive files recorded into the storage 130 before recording of the file F3 provided with the presented trigger ID, in accordance with the number of successive files set at the parameter setter 148, without adding additional information to the file F4 or F5. Alternatively, the information adder 146 may add additional information to one or more successive files recorded into the storage 130 after recording of the file F3 provided with the presented trigger ID, in accordance with the number of successive files set at the parameter setter 148, without adding additional information to the file F1 or F2. That is, the information adder 146 adds additional information to the file provided with the presented trigger ID and pieces of data recorded into the storage 130 in response to at least one of a previous satisfaction of the first trigger condition occurring previous to satisfaction of the first trigger condition corresponding to this file or a subsequent satisfaction of the first trigger condition occurring subsequent to the satisfaction of the first trigger condition corresponding to this file. Although the above description is directed to the differences from Embodiment 1, the configuration of Embodiment 2 may involve addition of additional information to files preceding and following the file designated by the trigger ID.

Embodiment 4

Figure 13:
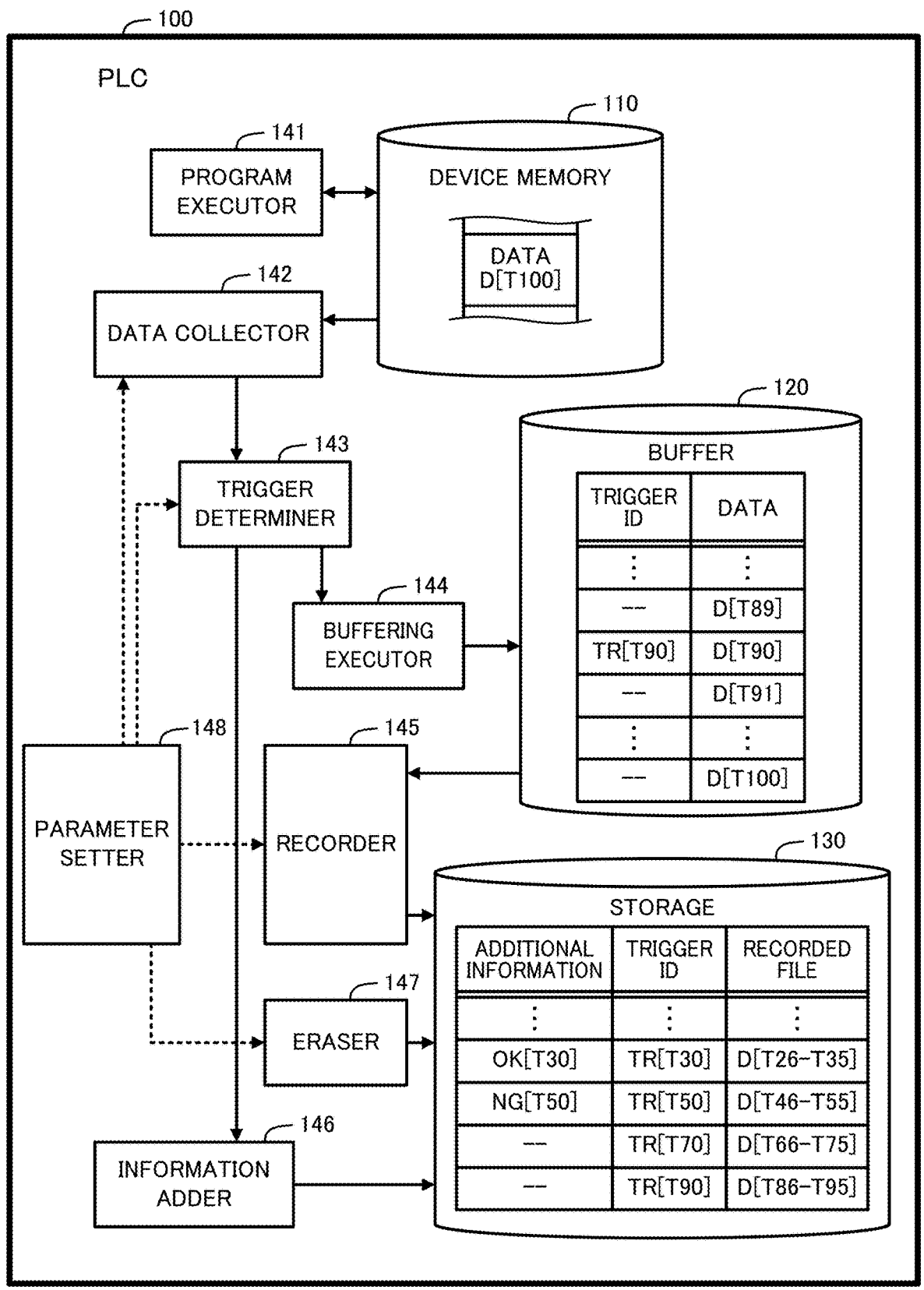
FIG. 13 illustrates a functional configuration of a PLC according to Embodiment 4.

Embodiment 4 is described below focusing on the differences from Embodiment 1. The component identical or corresponding to that in Embodiment 1 is provided with the same reference sign. Embodiment 4 differs from Embodiment 1 in that the information adder 146 adds any one type of additional information among multiple types of additional information. FIG. 13 illustrates a functional configuration of the PLC 100 according to Embodiment 4.

The description of Embodiment 1 is directed to an example in which the storage period for a file related to a product determined to have abnormality is extended. The user may, however, also demand to retain a file related to a product determined to have no abnormality or to be normal for a certain period and compare the file determined to have abnormality with the file determined to be normal.

The parameter setter 148 according to the embodiment thus preliminarily sets multiple types of second trigger conditions in the trigger determiner 143. The multiple types of second trigger conditions are a first-type second trigger condition for determination of normality of a product and a second-type second trigger condition for determination of abnormality of a product, for example. The second-type second trigger condition may be satisfied in the case of dissatisfaction of the first-type second trigger condition, or satisfied regardless of satisfaction of the first-type second trigger condition. For example, a product may be determined to have abnormality when a dimensional error of the product exceeds the allowable limit, and determined to be normal when the dimensional error falls below a value much lower than the allowable limit.

The parameter setter 148 sets parameters in the trigger determiner 143 such that satisfaction of the second-type second trigger condition for determination of abnormality of a product is determined for all the products, while satisfaction of the first-type second trigger condition for determination of normality of a product is determined for some of multiple products at regular intervals.

The trigger determiner 143 determines whether the multiple types of second trigger conditions are satisfied, in accordance with the parameters set at the parameter setter 148. When determining that any of the second trigger conditions is satisfied, the trigger determiner 143 notifies the information adder 146 of the trigger ID and the type of the second trigger condition. In the example illustrated in FIG. 13, the trigger determiner 143 notifies the information adder 146 of the trigger ID TR[T30] and information indicating normality, and of the trigger ID TR[T50] and information indicating abnormality.

On the basis of the notification from the trigger determiner 143, the information adder 146 adds, to the file with the presented trigger ID, additional information corresponding to the presented type. In the example illustrated in FIG. 13, the information adder 146 adds additional information OK[T30] indicating normality to a file D[T26-T35] provided with the trigger ID TR[T30], and adds additional information NG[T50] indicating abnormality to a file D[T46-T55] provided with the trigger ID TR[T50], for example. The addition of additional information may be insertion of a character string "OK" indicating normality or a character string "NG" indicating abnormality to the end of the file or the file name, or addition of a folder attribute corresponding to the type.

The eraser 147 erases, from the storage 130, a file that has expired a period corresponding to the type of additional information. For example, the eraser 147 may erase files without additional information in the chronological order when the remaining capacity of the storage 130 becomes lower than 10%, so as to maintain the remaining capacity to be at least 10%. The eraser 147 may also erase files provided with the additional information indicating abnormality in the chronological order when each of the files has expired the storage period of one year. Alternatively, the eraser 147 may erase files provided with the additional information indicating normality in the chronological order when the number of files stored in the storage 130 exceeds 100. Since abnormality is expected to occur at a low frequency in general, it is reasonable to retain files determined to be abnormal in the storage 130 for a period longer than that of files determined to be normal, and retain the minimum number of files determined to be normal to be compared with the files determined to be abnormal. The eraser 147 according to the embodiment corresponds to another example of erasing means for retaining a piece of data provided with additional information corresponding to a certain type of second trigger condition in the storage means for a period corresponding to this type, and then erases the piece of data from the storage means.

As described above, when a second condition of one type of multiple types into which second trigger condition is classified is satisfied, the information adder 146 adds additional information corresponding to this type to a file, and the eraser 147 retains the file provided with the additional information in the storage 130 for a period corresponding the type and then erases the file from the storage 130. This configuration can set storage periods different depending on the types of files to be stored.

The number of types of second trigger condition is not necessarily two and may also be three or more. For example, different abnormalities, such as dimensional error, weight error, and contaminants may cause mutually different types of additional information to be added to a file. Although the above description is directed to the differences from Embodiment 1, multiple types of additional information may also be applied to the configurations of Embodiments 2 and 3. In the case where multiple types of additional information are applied to Embodiment 3, additional information of the same type as that of the file designated by the trigger ID is added to files preceding and following this file.

Embodiment 5

Embodiment 5 is described below focusing on the differences from Embodiment 4. The component identical or corresponding to that in Embodiment 4 is provided with the same reference sign. Embodiment 5 differs from Embodiment 4 in that the display data generating device 300 generates display data for generating a screen based on multiple types of additional information.

Figure 14:
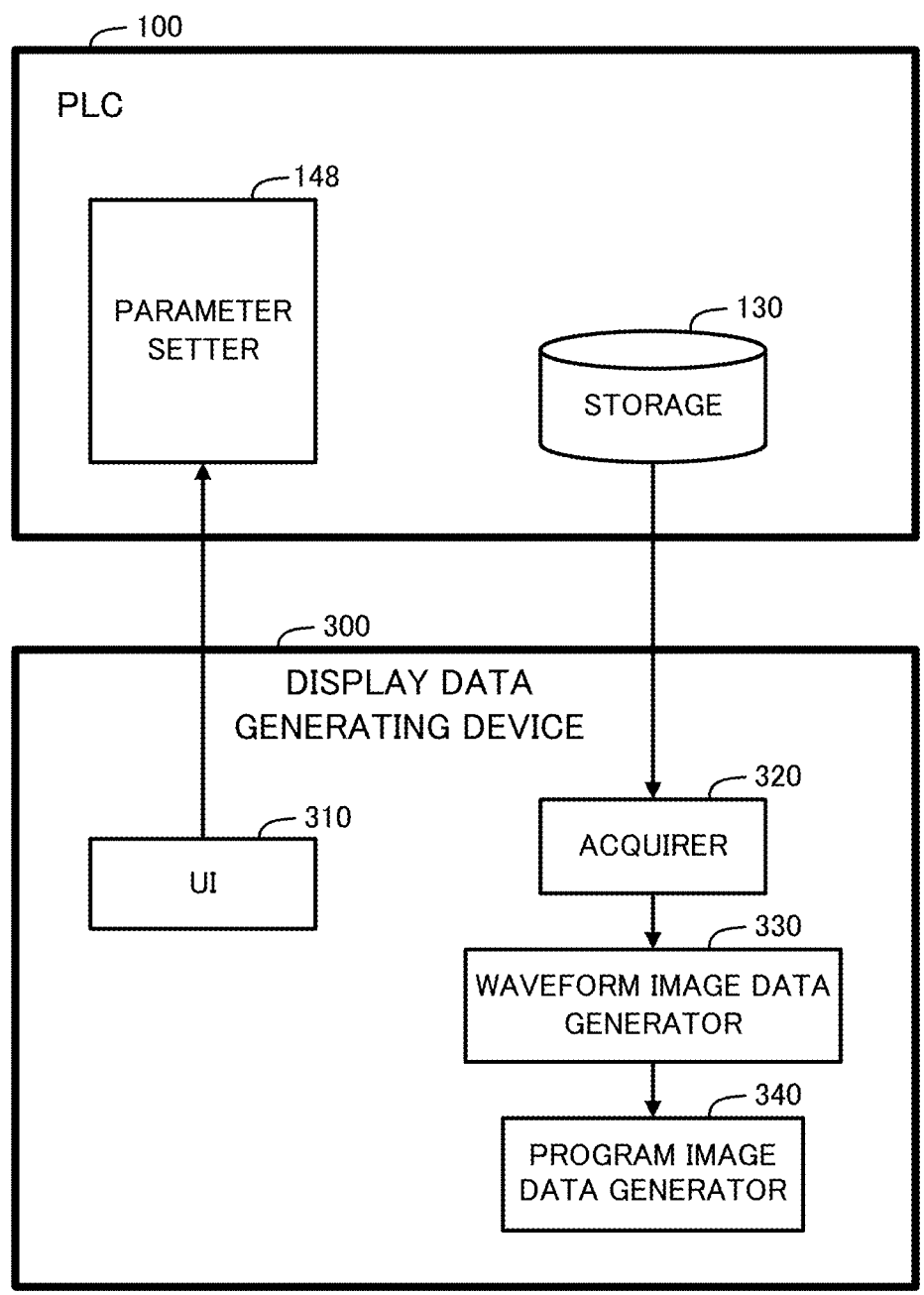
FIG. 14 illustrates a functional configuration of a display data generating device according to Embodiment 5.

FIG. 14 illustrates a functional configuration of the display data generating device 300 according to the embodiment. The display data generating device 300 has hardware components identical to those of the PLC 100 illustrated in FIG. 2, which cooperate with each other to perform various functions. As illustrated in FIG. 14, the display data generating device 300 includes a user interface (UI) 310 to receive parameters set at the parameter setter 148 of the PLC 100 from the user and output the parameters to the parameter setter 148, an acquirer 320 to read and acquire files from the storage 130, a waveform image data generator 330 for display of waveforms indicating transitions of values of the device data contained in the files, and a program image data generator 340 for display of information on the control program P2 in association with the waveforms.

Figure 15:
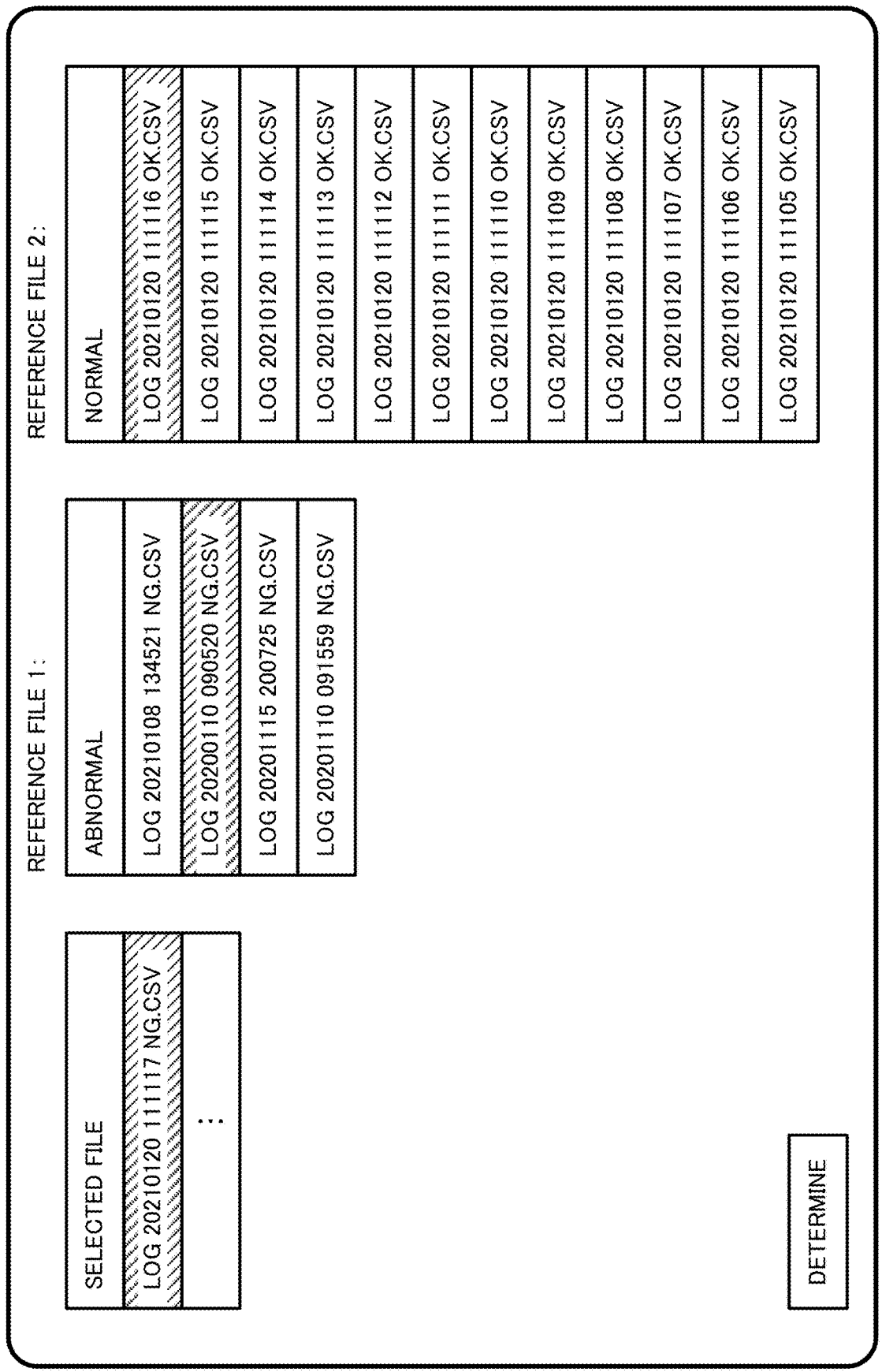
FIG. 15 illustrates a first example of a display screen according to Embodiment 5.

The acquirer 320 is mainly achieved by the communicator 106 of the display data generating device 300. The acquirer 320 acquires a list of files from the storage 130. The acquirer 320 then causes a screen like that illustrated in FIG. 15 to be displayed on the display 301, and thus promotes the user to select any one of the files. The screen illustrated in FIG. 15 shows a list of file names containing a character string "OK" indicating normality and file names containing a character string" NG" indicating abnormality.

When the user selects any of the files, the acquirer 320 specifies a file provided with the additional information indicating abnormality and a file provided with the additional information indicating normality and causes these files to appear in the screen, such that the files can be compared with the selected file. In detail, the acquirer 320 specifies files recorded into the storage 130 immediately before the file selected by the user, among the files provided with the additional information indicating normality and abnormality, and causes the specified files to be emphasized by hatching as illustrated in FIG. 15. Alternatively, the acquirer 320 may specify files recorded into the storage 130 immediately after the file selected by the user, among the files provided with the additional information indicating normality and abnormality. Alternatively, the files to be compared may be selected by the user in another step.

The user pushes or clicks the button indicating "determine" and thereby determines three files to appear on the display 301. The acquirer 320 corresponds to an example of reception means, in the display data generating device 300, for receiving a selection, by a user, of any one piece of first data from a plurality the pieces of first data stored in the programmable controller. The acquirer 320 outputs the determined three files to the waveform image data generator 330.

Figure 16:
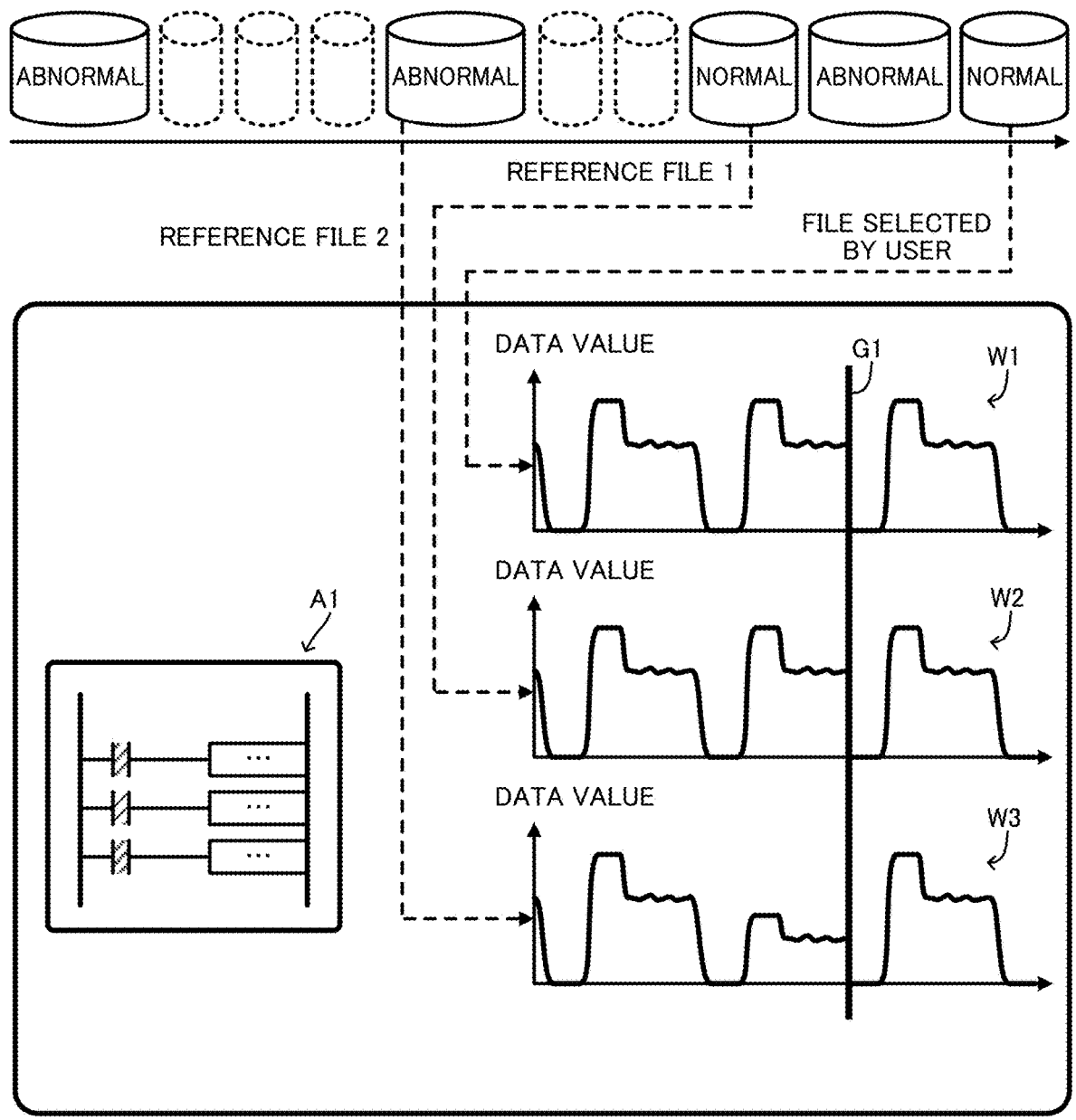
FIG. 16 illustrates a second example of the display screen according to Embodiment 5.

The waveform image data generator 330 causes transitions of values of the device data contained in the three files to appear on the display 301 in waveforms, in such a form that the user can compare the waveforms with each other. In detail, as illustrated in FIG. 16, the waveform image data generator 330 causes to display a waveform W1 indicating the file selected by the user and waveforms W2 and W3 to be compared, such that the piece of data provided with the trigger ID corresponding to satisfaction of the first trigger condition is aligned to a guide G1. The three waveforms are thus vertically arranged and can be readily compared with each other by the user. The waveform image data generator 330 may show the sampled values of the waveforms at the guide G1. The user may shift the guide G1 in the horizontal direction. The waveform image data generator 330 corresponds to an example of generation means, in the display data generating device 300, for (i) reading from the programmable controller the one piece of first data selected by the user and another piece of first data to which the additional information of a type identical to or different from a type of the additional information added to the one piece of first data is added previous to or subsequent to addition of the additional information to the one piece of first data, and (ii) generating display data for displaying information related to the read one piece of first data and the read other piece of first data.

The waveform image data generator 330 also outputs information on the file selected by the user to the program image data generator 340. The program image data generator 340 causes a subwindow A1 for showing information on the control program P2 to appear on the display 301, as illustrated in FIG. 16. This subwindow A1 shows the control program P2, which is a ladder program. When the user shifts the guide G1, the image of the subwindow A1 is updated to show the state of the ladder program at the designated timing. Specifically, the value of the device data corresponding to the sampled value of the waveform at the guide G1 is illustrated in the image of the ladder program.

As described above, transitions of the device data are displayed in such a form that the user can compare the transition with each other. This configuration can facilitate investigation of causes of troubles. Although three waveforms are displayed on the basis of the file selected by the user, a file provided with the additional information indicating normality in the vicinity of the selected file, and a file provided with the additional information indicating abnormality in the vicinity of the selected file in the above-described example, this configuration is a mere example. Two waveforms may also be displayed on the basis of the file selected by the user and the file provided with the additional information indicating normality or abnormality in the vicinity of the selected file. Although the above description is directed to the differences from Embodiment 4, the display data generating device 300 may generate display data for displaying information related to a piece of data corresponding to satisfaction of a single type of second trigger condition. For example, the display data generating device 300 may cause respective waveforms indicated by multiple files selected by the user to be displayed on the display 301.

Embodiment 6

Figure 17:
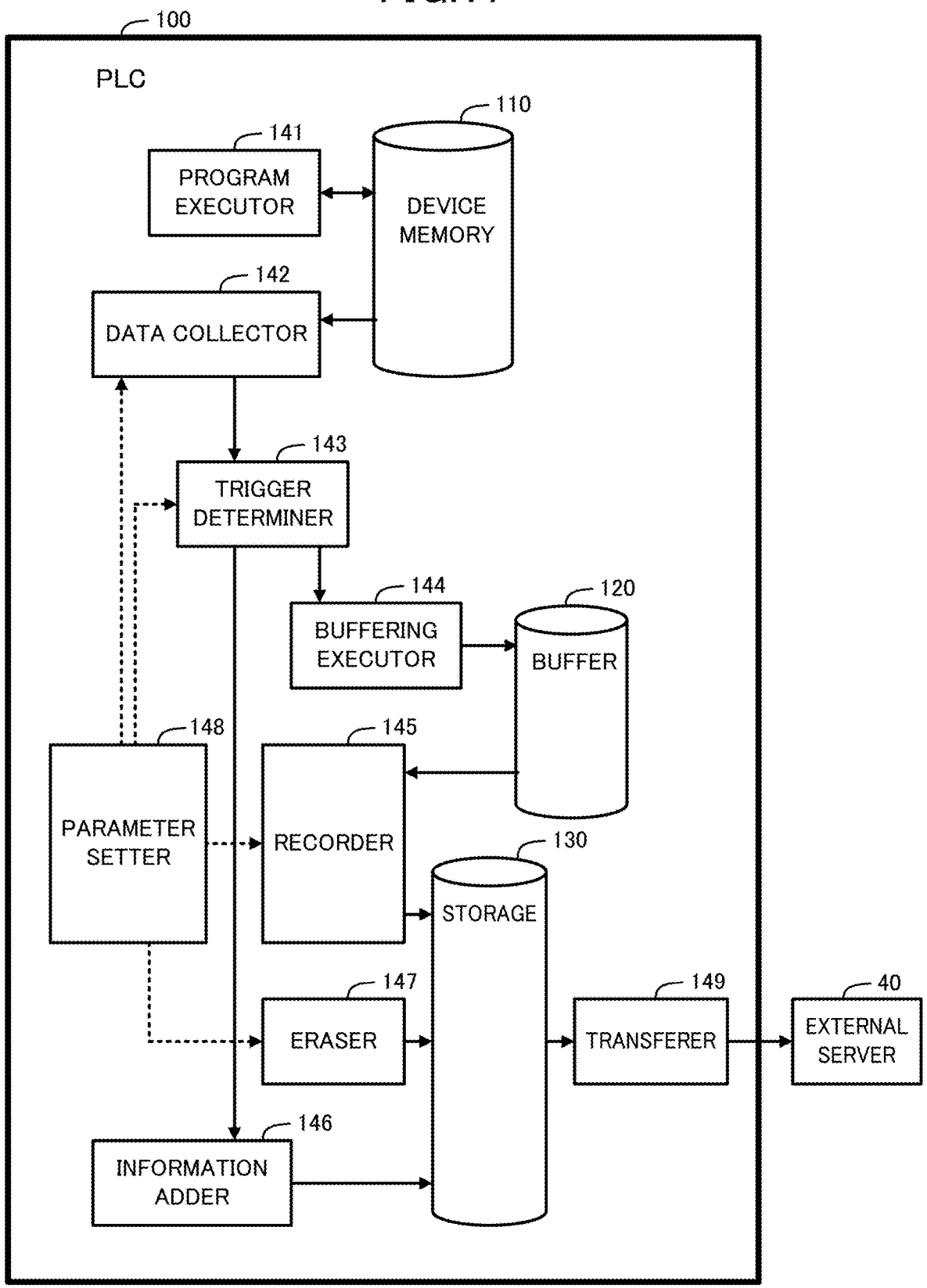
FIG. 17 illustrates a functional configuration of a PLC according to Embodiment 6.

Embodiment 6 is described below focusing on the differences from Embodiment 1. The component identical or corresponding to that in Embodiment 1 is provided with the same reference sign. Embodiment 6 differs from Embodiment 1 in that the PLC 100 includes a transferer 149 to transfer a piece of data to the outside, as illustrated in FIG. 17.

The transferer 149 monitors pieces of data recorded in the storage 130. In response to any update in the pieces of data, the transferer 149 transfers the pieces of data before or after the update to an external server 40 to be backed up. In detail, the transferer 149 transfers a file to the external server 40 when the recorder 145 records the file. The transferer 149 also transfers additional information and a file to be provided with the additional information to the external server 40 when the information adder 146 adds the additional information to the file. The transferer 149 also transfers a file to be erased to the external server 40 before the eraser 147 erases the file. The transferer 149 does not necessarily execute all of these transfers and may skip some of the transfers.

This configuration can allow the files erased from the storage 130 by the eraser 147 to be saved in the external server 40 and allow the user to refer to the files if necessary. The transferer 149 corresponds to an example of transfer means, in the PLC 100, for transferring information to a server. Although the above description is directed to the differences from Embodiment 1, the transferer 149 according to the embodiment may also be applied to the configurations of Embodiments 2 to 5.

The above-described embodiments are not to be construed as limiting the scope of the present disclosure.

For example, although the recorder 145 records a series of data containing the piece of data provided with the trigger ID into the storage 130 in the form of a file in the above-described embodiments, this configuration is a mere example. For example, the recorder 145 may record pieces of data read from the buffer 120 as they are into the storage 130 without converting the pieces of data into a file format.

In some conceivable cases, it is only required to find out an instantaneous value at the time of satisfaction of the first trigger condition because of low importance of a transition of the device data within a short period. In such cases, the recorder 145 may record a single piece of data provided with the trigger ID as it is or a file containing this single piece of data into the storage 130, instead of recording the file containing a series of data.

The addition of additional information to a file is not necessarily generation of a single data set containing both of the additional information and the file. The additional information may also be added by being associated with the file using management information for associating the additional information and the file stored in mutually different areas with each other. In order to use the management information, a reserved area is preferably ensured in case of update of the management information.

Although the additional information is added to a file that should be subject to extension of the storage period in the above-described embodiments, this configuration is a mere example. The additional information may be added to a file excluded from the targets to be subject to extension of the storage period, and the file with this additional information may be erased earlier than a file without the additional information. Alternatively, any of two or more types of additional information may be added to all the files. That is, the information adder 146 adds additional information to at least one of a piece of first data, which is a file recorded by the recorder 145 into the storage 130, or a piece of second data, which is collected by the data collector 142 after collection of the piece of first data. After the piece of first data and the piece of second data are recorded into the storage 130, the eraser 147 erases the piece of second data from the storage 130 while retaining the piece of first data in the storage 130 on the basis of the additional information.

In the above-described example, immediately after the data collector 142 reads a piece of data from the device memory 110, the trigger determiner 143 determines whether the first trigger condition is satisfied for this piece of data. That is, the timing of collecting data is substantially the same as the timing of determining whether the first trigger condition is satisfied in this example. These timings, however, are not necessarily the same.

Figure 18:
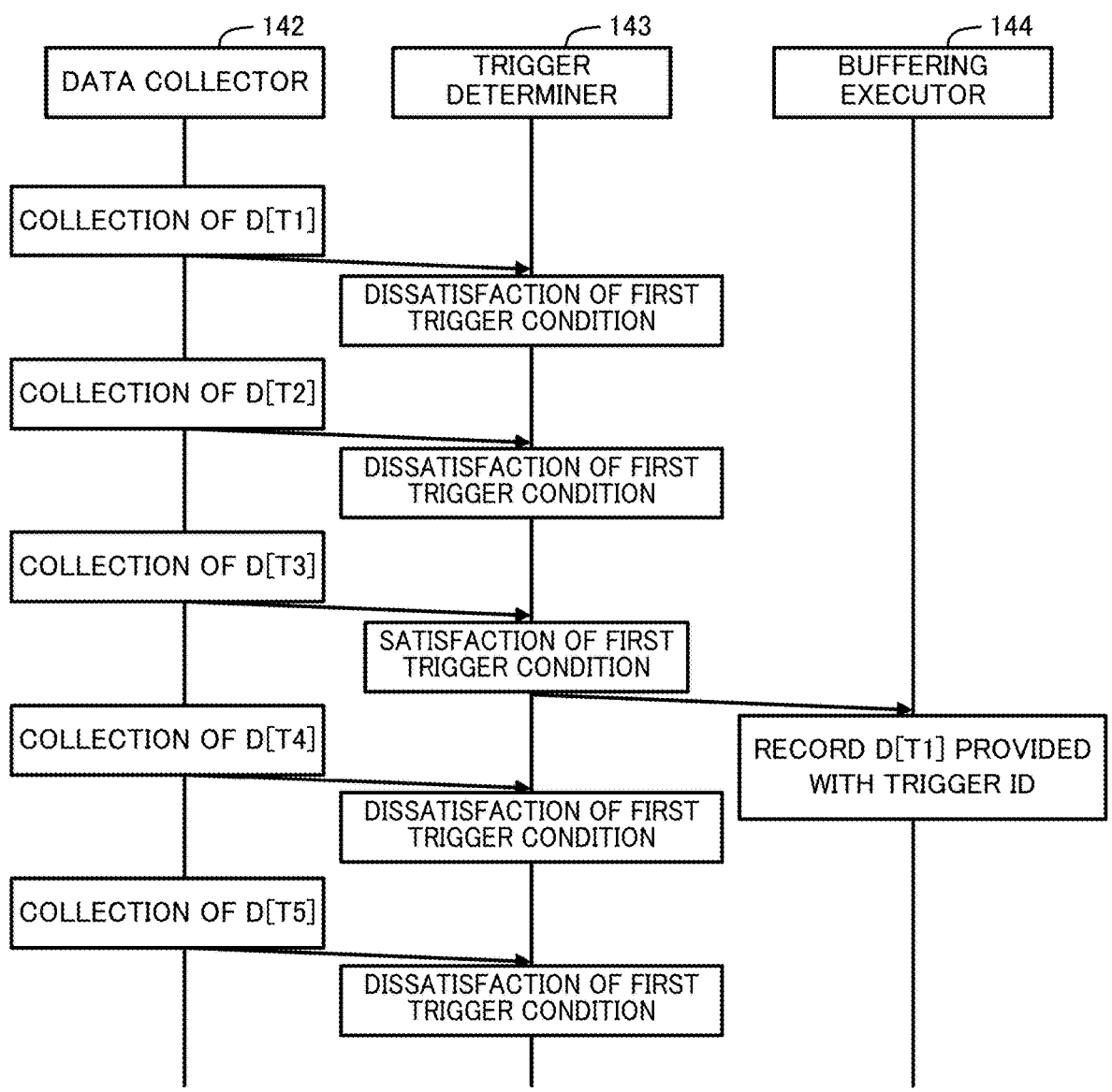
FIG. 18 is a diagram for describing a relationship between timings of collecting pieces of data and a piece of data provided with a trigger ID according to a modification.

For example, FIG. 18 illustrates an example in which the data collector 142 sequentially collects pieces of data D[T1], D[T2], D[T3], D[T4], and D[T5]. In this example, the first trigger condition is determined to be satisfied at the same timing as the output of the piece of data D[T3] to the trigger determiner 143. The trigger ID based on this determination may be provided to the piece of data D[T1] two pieces earlier than the piece of data D[T3]. That is, when the first trigger condition is determined to be satisfied at the same timing as the output of a piece of data D[Tn] to the trigger determiner 143, the trigger ID may be provided to a piece of data D[T(n−2)], where n indicates an integral number. Alternatively, in contrast to the example illustrated in FIG. 18, when the first trigger condition is determined to be satisfied at the same timing as the output of a piece of data D[Tn] to the trigger determiner 143, the trigger ID may be provided to a piece of data D[T(n+2)]. The piece of data to be recorded into the storage 130 is only required to be collected by the data collector 142 at a timing corresponding to every satisfaction of the first trigger condition.

The functions of the PLC 100 according to the above-described embodiments may be achieved by dedicated hardware or an ordinal computer system.

For example, the program P1 may be stored into a non-transitory computer-readable recording medium, such as flexile disk, compact disk read-only memory (CD-ROM), digital versatile disk (DVD), and magneto-optical disk (MO), for distribution and then installed in a computer to configure a device for performing the above-described processes.

The program P1 may also be stored in a disk drive included in a server device on a communication network represented by the Internet, and may be downloaded into a computer by being superimposed on a carrier wave, for example.

Alternatively, the program P1 may be activated while being transferred through a network represented by the Internet, to perform the above-described processes.

A server device may execute all or part of the program P1 and a computer may execute the program P1 while transmitting and receiving information on the executed processes to and from the server device via a communication network, to perform the above-described processes.

In the case where the above-described functions are shared by an operating system (OS) or achieved by cooperation of the OS and applications, only the components other than the OS may be stored in a non-transitory medium for distribution or downloaded into a computer.

The functions of the PLC 100 may also be performed by means other than software. Part or all of the functions may be performed by dedicated hardware or circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for logging of data for use in control executed by a PLC.

REFERENCE SIGNS LIST

1000 PLC system
100 PLC
101 Processor
102 Main storage
103 Auxiliary storage
104 Inputter
105 Outputter
106 Communicator
107 Internal bus
110 Device memory
111 Device data
120 Buffer
130 Storage
141 Program executor
142 Data collector
143 Trigger determiner
144 Buffering executor
145 Recorder
146 Information adder
147 Eraser
148 Parameter setter
149 Transferer
200 Mechanical device
201 Fabrication completion sensor
202 Inspection sensor
300 Display data generating device
301 Display
310 UI
320 Acquirer
330 Waveform image data generator
340 Program image data generator
40 External server
A1 Subwindow
F1 to F5 File
G1 Guide
P1 Program
P2 Control program
W1 to W3 Waveform

The invention claimed is:

1. A programmable controller for controlling a machine, the programmable controller comprising:
    data collecting circuitry to repetitively collect, from a memory, a piece of data that is variable depending on control of the machine;
    recording circuitry to, when a predetermined first trigger condition is satisfied, record into a storage a piece of data collected by the data collecting circuitry at a timing corresponding to satisfaction of the first trigger condition;
    adding circuitry to, when a second trigger condition is satisfied, add additional information to a piece of first data or a piece of second data, each of the piece of first data and the piece of second data being the piece of data recorded by the recording circuitry into the storage, the piece of second data being collected by the data collecting circuitry after collection of the piece of first data, the second trigger condition being different from the first trigger condition; and
    erasing circuitry to, after the piece of first data and the piece of second data are recorded into the storage, based on a determination for each of the piece of first data and the piece of second data on whether the piece of data is provided with the additional information, erase the piece of second data from the storage while retaining the piece of first data in the storage, wherein
    the second trigger condition is a condition requiring for extension of a period of storage of the piece of first data in the storage in comparison to a period in a case of dissatisfaction of the second trigger condition.

2. The programmable controller according to claim 1, wherein
    the adding circuitry adds the additional information to the piece of first data, and
    the erasing circuitry erases, while retaining in the storage the piece of first data provided with the additional information, from the storage, the piece of second data excluded from a target to be provided with the additional information by the adding circuitry.

3. The programmable controller according to claim 2, further comprising:
    a buffer to sequentially store a plurality of the pieces of data collected by the data collecting circuitry, wherein
    when the second trigger condition is satisfied, the adding circuitry adds the additional information to the piece of first data among the piece of first data and a piece of third data recorded in the buffer, the piece of third data being collected before collection of the piece of first data, and
    the recording circuitry sequentially reads the pieces of data from the buffer and records the pieces of data into the storage, such that the piece of first data provided with the additional information is, in priority to the piece of third data, read from the buffer and stored into the storage.

4. The programmable controller according to claim 2, wherein
    the second trigger condition is classified into a plurality of types, when a second trigger condition of one type of the plurality of types is satisfied, the adding circuitry adds, to the piece of first data, additional information corresponding to the one type, and the erasing circuitry retains the piece of first data provided with the additional information in the storage for a period corresponding to the one type, and then erases the piece of first data from the storage.

5. The programmable controller according to claim 2, wherein the adding circuitry adds the additional information to the piece of first data and a piece of fourth data, the piece of fourth data being recorded into the storage in response to at least one of a previous satisfaction of the first trigger condition or a subsequent satisfaction of the first trigger condition, the previous satisfaction of the first trigger condition occurring previous to satisfaction of the first trigger condition corresponding to the piece of first data, the subsequent satisfaction of the first trigger condition occurring subsequent to the satisfaction of the first trigger condition corresponding to the piece of first data.

6. The programmable controller according to claim 1, wherein
the erasing circuitry erases the piece of second data from the storage while retaining the piece of first data in the storage at a specific timing, and
the specific timing is a timing after elapse of at least a predetermined period since storage of the piece of second data into the storage, a timing after elapse of at least a predetermined period since the satisfaction of the first trigger condition, or a timing when a number or amount of the pieces of data stored in the storage exceeds a threshold.

7. The programmable controller according to claim 1, further comprising:
transferring circuitry to execute at least one of
transfer of the piece of first data and the piece of second data to a server, disposed outside the programmable controller, when the recording circuitry records the piece of first data and the piece of second data,
transfer of the additional information and a piece of data to be provided with the additional information to the server when the adding circuitry adds the additional information to at least one of the piece of first data or the piece of second data, or
transfer of the piece of second data to the server before the erasing circuitry erases the piece of second data.

8. A programmable controller system comprising:
the programmable controller according to claim 2; and
a display data generating device to connect to the programmable controller, wherein
the display data generating device reads a plurality of the pieces of first data provided with the additional information from the programmable controller, and generates display data for displaying information related to the pieces of first data.

9. A programmable controller system comprising:
the programmable controller according to claim 4; and
a display data generating device to connect to the programmable controller, wherein
the display data generating device includes
receiving circuitry to receive a selection, by a user, of any one piece of first data from a plurality of the pieces of first data stored in the programmable controller, and
generating circuitry to (i) read from the programmable controller the one piece of first data selected by the user and another piece of first data to which the additional information is added previous to or subsequent to addition of the additional information to the one piece of first data, and (ii) generate display data for displaying information related to the read one piece of first data and the read other piece of first data, a type of the additional information added to the other piece of first data being identical to or different from a type of the additional information added to the one piece of first data.

10. A data storage method executed by a programmable controller, the data storage method comprising:
repetitively collecting, from a memory, a piece of data that is variable;
when a predetermined first trigger condition is satisfied, recording into a storage a piece of data collected at a timing corresponding to satisfaction of the first trigger condition;
when a second trigger condition is satisfied, adding additional information to a piece of first data or a piece of second data, each of the piece of first data and the piece of second data being the piece of data recorded into the storage, the piece of second data being collected after collection of the piece of first data, the second trigger condition being different from the first trigger condition; and
after the piece of first data and the piece of second data are recorded into the storage, based on a determination for each of the piece of first data and the piece of second data on whether the piece of data is provided with the additional information, erasing the piece of second data from the storage while retaining the piece of first data in the storage, wherein
the second trigger condition is a condition requiring for extension of a period of storage of the piece of first data in the storage in comparison to a period in a case of dissatisfaction of the second trigger condition.

11. A non-transitory recording medium storing a program for causing a programmable controller to:
repetitively collect, from a memory, a piece of data that is variable;
when a predetermined first trigger condition is satisfied, record into a storage a piece of data collected at a timing corresponding to satisfaction of the first trigger condition;
when a second trigger condition is satisfied, add additional information to a piece of first data or a piece of second data, each of the piece of first data and the piece of second data being the piece of data recorded into the storage, the piece of second data being collected after collection of the piece of first data, the second trigger condition being different from the first trigger condition; and
after the piece of first data and the piece of second data are recorded into the storage, based on a determination for each of the piece of first data and the piece of second data on whether the piece of data is provided with the additional information, erase the piece of second data from the storage while retaining the piece of first data in the storage, wherein
the second trigger condition is a condition requiring for extension of a period of storage of the piece of first data in the storage in comparison to a period in a case of dissatisfaction of the second trigger condition.

* * * * *